US012761498B2

(12) United States Patent
Kitahara et al.

(10) Patent No.: US 12,761,498 B2
(45) Date of Patent: Oct. 13, 2026

(54) IMAGE DISPLAY DEVICE

(71) Applicant: NICHIA CORPORATION, Anan (JP)

(72) Inventors: Wataru Kitahara, Kamiina-gun (JP); Takanori Aruga, Suwa-gun (JP); Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 260 days.

(21) Appl. No.: 18/511,505

(22) Filed: Nov. 16, 2023

(65) Prior Publication Data

US 2024/0184130 A1 Jun. 6, 2024

(30) Foreign Application Priority Data

Dec. 6, 2022 (JP) ................................ 2022-194984

(51) Int. Cl.
*G02B 30/26* (2020.01)
*B60K 35/29* (2024.01)

(52) U.S. Cl.
CPC ............. *G02B 30/26* (2020.01); *B60K 35/29* (2024.01); *B60K 2360/23* (2024.01)

(58) Field of Classification Search
None
See application file for complete search history.

(56) References Cited

U.S. PATENT DOCUMENTS

| | | | |
|---|---|---|---|
| 5,729,242 | A | 3/1998 | Margerum et al. |
| 5,764,407 | A | 6/1998 | Nanba |
| 10,606,075 | B2 | 3/2020 | Choi et al. |
| 11,169,377 | B1 | 11/2021 | Chen |
| 11,287,649 | B2 | 3/2022 | Hong |
| 2003/0035232 | A1 | 2/2003 | Sasaki |
| 2003/0107716 | A1 | 6/2003 | Ogawa |

(Continued)

FOREIGN PATENT DOCUMENTS

| | | |
|---|---|---|
| JP | H03-273943 A | 12/1991 |
| JP | H06-347708 A | 12/1994 |

(Continued)

OTHER PUBLICATIONS

Non-Final Office Action in U.S. Appl. No. 18/538,112 dated Mar. 19, 2025.

(Continued)

*Primary Examiner* — Jyotsna V Dabbi
(74) *Attorney, Agent, or Firm* — Foley & Lardner LLP

(57) ABSTRACT

An image display device includes: a first display device configured to display a first image; an imaging optical system including: an input element configured to receive light emitted from the first display device, and an output element configured to receive light traveling via the input element and to emit light to form a real image corresponding to the first image; an optical member configured to reflect light emitted from the imaging optical system; and a second display device configured to display a second image. The imaging optical system is substantially telecentric at a real image side. The first display device is configured such that the light emitted from the first display device exhibits a substantially Lambertian light distribution. The imaging optical system and the optical member are configured such that the real image is formed between the imaging optical system and the optical member.

16 Claims, 14 Drawing Sheets

(56) References Cited

U.S. PATENT DOCUMENTS

2004/0145814 A1 7/2004 Rogers
2005/0007593 A1 1/2005 Lebens
2005/0052617 A1 3/2005 Fujikawa et al.
2007/0024977 A1 2/2007 Kawamura et al.
2007/0146242 A1 6/2007 Miller et al.
2008/0316606 A1 12/2008 Inoguchi et al.
2009/0040588 A1 2/2009 Tonar et al.
2009/0167989 A1 7/2009 Ito et al.
2010/0109977 A1 5/2010 Yamazaki et al.
2010/0271396 A1 10/2010 Nemeth et al.
2011/0164311 A1 7/2011 Morikuni
2012/0020092 A1 1/2012 Bailey
2015/0253469 A1 9/2015 Le Gros et al.
2015/0378104 A1 12/2015 Takahashi
2017/0146803 A1 5/2017 Kishigami et al.
2017/0146809 A1 5/2017 Furuya
2018/0024335 A1 1/2018 Uehara
2018/0039077 A1 2/2018 Kuzuhara et al.
2018/0120562 A1* 5/2018 Yata .................. G02F 1/133528
2018/0352204 A1 12/2018 Fujita
2018/0358339 A1 12/2018 Iguchi
2019/0011712 A1 1/2019 Nagano et al.
2019/0049725 A1 2/2019 Kondo et al.
2019/0061525 A1 2/2019 Ji
2019/0061638 A1 2/2019 Hisatsugu et al.
2019/0071014 A1 3/2019 Misu
2019/0072764 A1 3/2019 Lee et al.
2019/0072799 A1 3/2019 Narushima
2019/0073828 A1 3/2019 Oiwa
2019/0235240 A1* 8/2019 Nagano .................... G09G 5/00
2020/0050005 A1 2/2020 Kojima et al.
2020/0201036 A1 6/2020 Hong
2020/0271927 A1 8/2020 Kawana
2020/0319456 A1 10/2020 Yatsu et al.
2020/0333608 A1 10/2020 Katagiri et al.
2021/0239989 A1 8/2021 Ide et al.
2021/0325700 A1 10/2021 Chen
2021/0373331 A1 12/2021 Gu et al.
2021/0382304 A1 12/2021 You et al.
2022/0035165 A1 2/2022 Takeda et al.
2022/0046212 A1 2/2022 Xu et al.
2022/0138916 A1 5/2022 Takagi et al.
2022/0350139 A1 11/2022 Tsuda et al.
2022/0365266 A1 11/2022 Cheng et al.
2022/0365345 A1 11/2022 Hamada
2023/0026137 A1* 1/2023 Kusafuka ............... G09G 3/002
2023/0034288 A1 2/2023 Hong et al.
2023/0118416 A1 4/2023 Hirata et al.
2023/0206795 A1 6/2023 Lyou et al.
2023/0207606 A1 6/2023 Mezouari et al.
2023/0415576 A1 12/2023 Zozgornik
2024/0061240 A1 2/2024 Hirata et al.
2024/0210684 A1 6/2024 Kitahara et al.
2024/0241421 A1 7/2024 Marchewka et al.

FOREIGN PATENT DOCUMENTS

JP H07-140918 A 6/1995
JP H07-306377 A 11/1995
JP H09-200651 A 7/1997
JP H10-274740 A 10/1998
JP 2003-005073 A 1/2003
JP 2003-043360 A 2/2003
JP 2003-177320 A 6/2003
JP 2004-045718 A 2/2004
JP 2004-527801 A 9/2004
JP 2005-070255 A 3/2005
JP 2007-058163 A 3/2007
JP 2009-003128 A 1/2009
JP 2009-251194 A 10/2009
JP 2010-107873 A 5/2010
JP 2011-138086 A 7/2011
JP 2013-183042 A 9/2013
JP 2014-183192 A 9/2014
JP 2016-033867 A 3/2016
JP 2016-102810 A 6/2016
JP 2016-148829 A 8/2016
JP 2017-037304 A 2/2017
JP 2017-049371 A 3/2017
JP 2019-073272 A 5/2019
JP 2019-095690 A 6/2019
JP 2020-012986 A 1/2020
JP 2020-074005 A 5/2020
JP 2020-144184 A 9/2020
JP 6809441 B2 1/2021
JP 2021-124527 A 8/2021
JP 2021-162801 A 10/2021
JP 2021-529332 A 10/2021
JP 2022-025889 A 2/2022
JP 2022-073094 A 5/2022
JP 2022-129223 A 9/2022
WO WO-2014/207457 A1 12/2014
WO WO-2015/190157 A1 12/2015
WO WO-2016/103418 A1 6/2016
WO WO-2016/208195 A1 12/2016
WO WO-2017/138242 A1 8/2017
WO WO-2017/154360 A1 9/2017
WO WO-2017/170702 A1 10/2017
WO WO-2019/008684 A1 1/2019
WO WO-2019/130860 A1 7/2019
WO WO-2019/130944 A1 7/2019
WO WO-2021/054277 A1 3/2021
WO WO-2021/065820 A1 4/2021
WO WO-2021/106689 A1 6/2021

OTHER PUBLICATIONS

U.S. Appl. No. 18/511,505, filed Nov. 16, 2023, Kitahara et al.
U.S. Appl. No. 18/691,498, filed Mar. 13, 2024, Kitahara et al.
U.S. Appl. No. 18/867,745, filed Nov. 20, 2024, Kitahara et al.
U.S. Appl. No. 18/870,981, filed Dec. 2, 2024, Kitahara et al.
U.S. Appl. No. 18/956,890, filed Nov. 22, 2024, Kitahara et al.
Notice of Allowance in U.S. Appl. No. 18/496,594 dated Dec. 4, 2024.
Final Office Action in U.S. Appl. No. 18/538,112 dated Jul. 22, 2025.
Non-Final Office Action in U.S. Appl. No. 18/538,112 dated Nov. 5, 2024.
Notice of Allowance in U.S. Appl. No. 18/513,895 Dtd Aug. 6, 2024.
U.S. Appl. No. 18/390,954, filed Dec. 20, 2023, Kitahara et al.
U.S. Appl. No. 18/513,895, filed Nov. 20, 2023, Kitahara et al.
U.S. Appl. No. 18/538,112, filed Dec. 13, 2023, Aruga et al.
U.S. Appl. No. 18/543,762, filed Dec. 18, 2023, Kitahara et al.
Non-Final Office Action in U.S. Appl. No. 18/496,594 Dtd Jul. 11, 2024.
U.S. Appl. No. 18/496,594, filed Oct. 27, 2023, Kitahara et al.
Non-Final Office Action on U.S. Appl. No. 18/390,954 dated Dec. 4, 2025.
Non-Final Office Action in U.S. Appl. No. 18/691,498 dated Jan. 23, 2026.
Notice of Allowance in U.S. Appl. No. 18/543,762 dated Jun. 16, 2026.
Notice of Allowance in U.S. Appl. No. 18/956,890 dated Jul. 2, 2026.
Non-Final Office Action in U.S. Appl. No. 18/867,745 dated Aug. 3, 2026.
Non-Final Office Action in U.S. Appl. No. 18/870,981 dated Aug. 10, 2026.
Notice of Allowance in U.S. Appl. No. 18/978,166 dated Aug. 14, 2026.
Notice of Reasons for Refusal issued in Japanese Appl. No. 2022-182313 dated Sep. 2, 2026.
Notice of Reasons for Refusal issued in Japanese Appl. No. 2024-524176 dated Aug. 26, 2026.
Notice of Reasons for Refusal issued in Japanese Appl. No. 2024-526238 dated Aug. 26, 2026.

* cited by examiner

IMAGE DISPLAY DEVICE

CROSS-REFERENCE TO RELATED APPLICATIONS

This application is based upon and claims the benefit of priority from the prior Japanese Patent Application No. 2022-194984, filed on Dec. 6, 2022; the entire contents of which are incorporated herein by reference.

FIELD

The present disclosure relates to an image display device.

BACKGROUND

PCT Publication No. WO 2016/208195 discloses a technology in which light emitted from a display device is sequentially reflected by multiple mirrors, and the light reflected by the final mirror is further reflected toward a user by a reflecting member such as a windshield or the like, thereby causing the user to view a virtual image corresponding to the image displayed by the display device. In recent years, there has been a demand for the display of images of different focal lengths.

SUMMARY

An object of certain embodiments of the present invention is to provide an image display device configured to display images of different focal lengths.

According to one aspect of the present invention, an image display device includes a first display device configured to display a first image, an imaging optical system, an optical member reflecting light emitted from the imaging optical system, and a second display device configured to display a second image. The imaging optical system includes an input element on which light emitted from the first display device is incident, and an output element on which light traveling via the input element is incident. The output element emits light to form a real image corresponding to the first image. The imaging optical system is substantially telecentric at the real image side. The light emitted from the first display device exhibiting a substantially Lambertian light distribution. The real image is formed between the imaging optical system and the optical member.

According to embodiments of the invention, an image display device that is configured to display images of different focal lengths can be provided.

DETAILED DESCRIPTION

Figure 1:
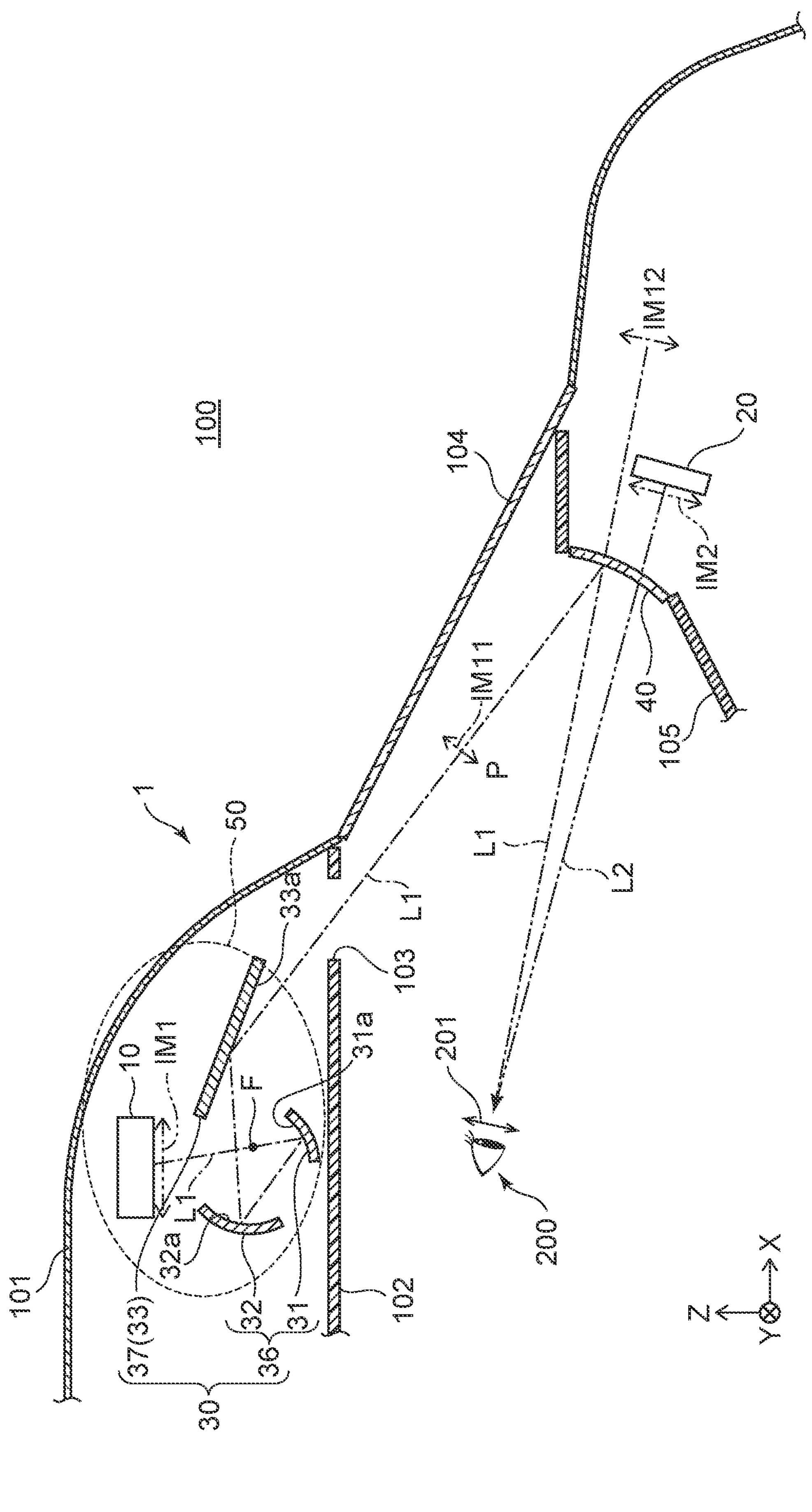
FIG. 1 is an end view showing an image display device according to a first embodiment.

Exemplary embodiments will now be described with reference to the drawings. The drawings are schematic or conceptual, and are simplified or enhanced as appropriate. For example, the relationships between the thickness and width of portions, the proportions of sizes among portions, etc., are not necessarily the same as the actual values. Furthermore, the dimensions and proportional coefficients may be illustrated differently among drawings, even for identical portions. In the specification of the application and the drawings, components similar to those described in regard to a drawing thereinabove are marked with like reference numerals, and a detailed description is omitted as appropriate.

First Embodiment

Overall Configuration and Operation

FIG. 1 is an end view showing an image display device according to the present embodiment.

Figure 2:
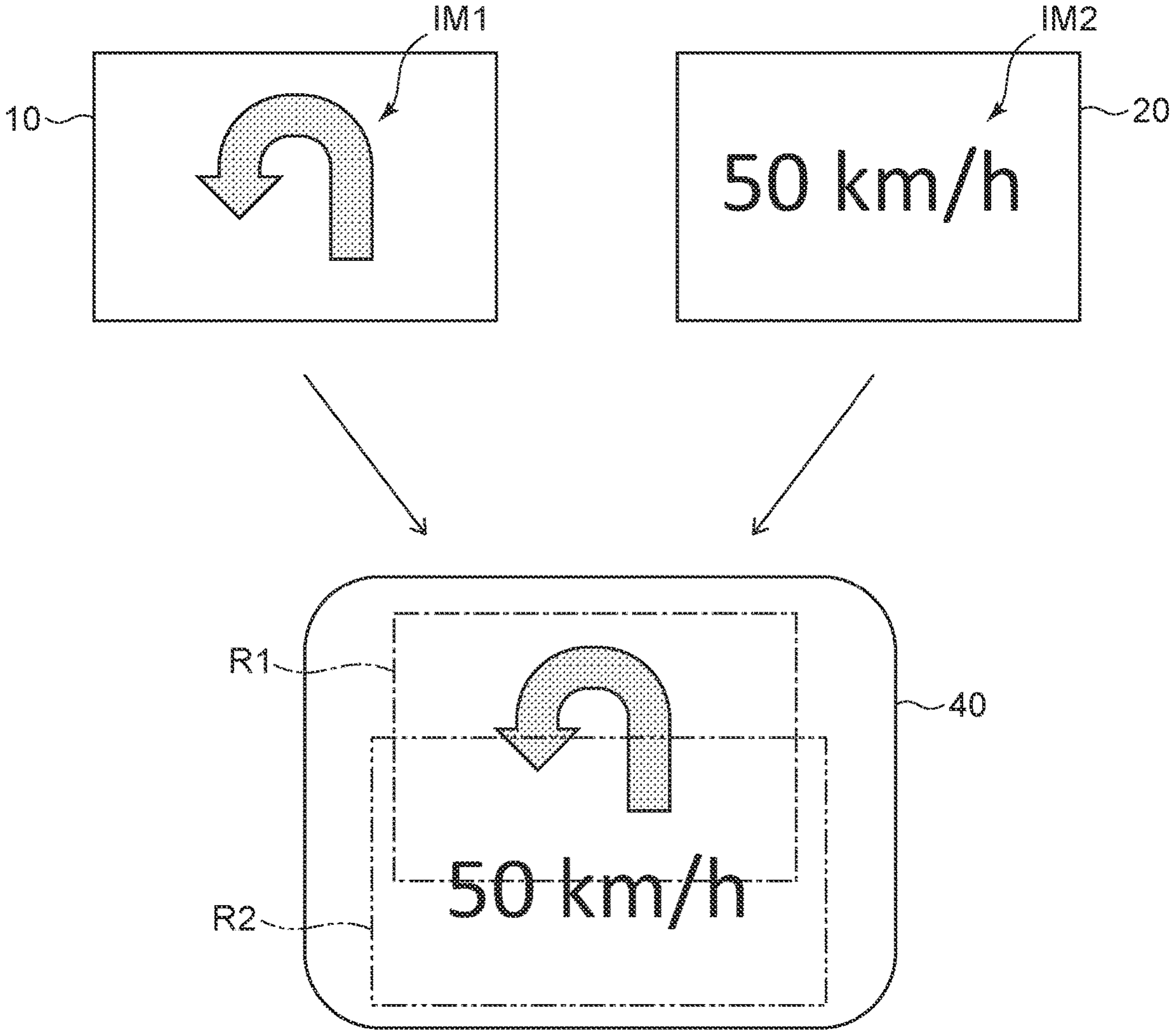
FIG. 2 shows a first image displayed by a first display device, a second image displayed by a second display device, and an image at an optical member that is visible to a viewer for the image display device according to the first embodiment.

FIG. 2 shows a first image displayed by a first display device, a second image displayed by a second display device, and an image at an optical member that is visible to a viewer for the image display device according to the present embodiment.

As shown in FIG. 1, an automobile 100 includes a vehicle 101, and an image display device 1 mounted in the vehicle 101. A viewer 200 is a passenger of the automobile 100 and is, for example, the driver. An eyebox 201 of the viewer 200 refers to the area in the space in front of the eyes of the viewer 200 in which an image and a virtual image described below are visible.

The image display device 1 includes a first display device 10, a second display device 20, an imaging optical system 30, and an optical member 40. The first display device 10 is configured to display a first image IM1. The second display device 20 is configured to display a second image IM2. In FIG. 1, the optical path of a light L1 emitted from the first display device 10 and the direction in which the image formed by the light L1 is viewed are illustrated by a single dot-dash line, and the optical path of a light L2 emitted from the second display device 20 and the direction in which the image formed by the light L2 is viewed are illustrated by a double dot-dash line. This is similar for similar drawings described below as well.

The imaging optical system 30 includes an input element 31 on which the light L1 emitted from the first display device 10 is incident, an intermediate element 32 on which the light L1 reflected by the input element 31 is incident, and an output element 33 on which the light L1 reflected by the intermediate element 32 is incident. The light L1 that is reflected by the output element 33 forms a real image IM11 corresponding to the first image IM1 as an intermediate image at a position P between the imaging optical system 30 and the optical member 40. The conditions at which the real image IM11 is formed are described below.

The light L1 that is emitted from the imaging optical system 30 is incident on the optical member 40, and the optical member 40 reflects the light L1. According to the present embodiment, the optical member 40 also transmits the light L2 emitted from the second display device 20. The light L1 emitted from the imaging optical system 30 and reflected by the optical member 40 and the light L2 emitted from the second display device 20 and transmitted by the optical member 40 are oriented in the same direction. "The light L1 and the light L2 are oriented in the same direction" includes not only being oriented in exactly the same direction, but also being oriented not in the exact same direction but in directions near enough that both the light L1 and L2 enter the eyebox 201.

A light source unit 50 includes the first display device 10 and the imaging optical system 30. The light source unit 50 is located above a ceiling board 102 of the passenger compartment of the vehicle 101. The light L1 that is emitted from the first display device 10 is sequentially reflected by the input element 31, the intermediate element 32, and the output element 33 of the imaging optical system 30. The light L1 that is emitted from the light source unit 50 is incident on the optical member 40 via a hole 103 in the ceiling board 102. The optical member 40 is located in an exposed part inside the passenger compartment below a front windshield 104 of the vehicle 101, e.g., at a dashboard 105 vicinity. The light L1 that is incident on the optical member 40 is reflected by the optical member 40 and enters the eyebox 201 of the viewer 200.

On the other hand, the second display device 20 is located depthward of the optical member 40, for example, inside the dashboard 105, when viewed by the viewer 200. The light L2 that is emitted from the second display device 20 is transmitted by the optical member 40 and enters the eyebox 201 of the viewer 200.

As a result, as shown in FIGS. 1 and 2, the viewer 200 views the second image IM2 and a virtual image IM12 corresponding to the first image IM1 depthward of the optical member 40. At this time, when viewed by the viewer 200, the distance between the optical member 40 and the virtual image IM12 is equal to the distance between the optical member 40 and the real image IM11. The distance between the optical member 40 and the second image IM2 is equal to the distance between the optical member 40 and the second display device 20 and less than the distance between the optical member 40 and the virtual image IM12. Therefore, when viewed by the viewer 200, the focal length of the virtual image IM12 corresponding to the first image IM1 and the focal length of the second image IM2 are different from each other. In other words, the viewer 200 can view two images of different focal lengths. As a result, the image display device 1 can display a three-dimensional image. In the specification, "image" includes all visually recognizable information such as images, characters, symbols, pictograms, etc. "Image" includes still images and video images. Hereinbelow, still images and video images are generally referred to as simply "image".

As shown in FIG. 2, the optical member 40 includes a first region R1 reflecting the light L1 emitted from the imaging optical system 30, and a second region R2 transmitting the light L2 emitted from the second display device 20. The virtual image IM12 is displayed in the first region R1, and the second image IM2 is displayed in the second region R2. In the example shown in FIG. 2, a portion of the first region R1 and a portion of the second region R2 overlap each other.

When viewed by the viewer 200, the focal length of the virtual image IM12 and the focal length of the second image IM2 are different from each other. In the example shown in FIG. 1, when viewed by the viewer 200, the focal length of the virtual image IM12 is greater than the focal length of the second image IM2. Therefore, the viewer 200 perceives the virtual image IM12 to be more distant than the second image IM2. However, the focal length of the virtual image IM12 may be less than the focal length of the second image IM2 so that the viewer 200 perceives the virtual image IM12 to be more proximate than the second image IM2.

For example, navigation information and/or information of the periphery of the automobile 100 may be displayed as the first image IM1. FIG. 2 shows an example illustrating the existence of a left curve. Substantially the same content as the first image IM1 is viewed as the virtual image IM12. For example, information of the state of the automobile 100 may be displayed as the second image IM2. FIG. 2 shows an example of displaying the speed of the automobile 100.

Configurations of components of the image display device 1 will now be described in detail.

An XYZ orthogonal coordinate system is employed hereinbelow for easier understanding of the description. According to the present embodiment, the longitudinal direction of the vehicle 101 is taken as an "X-direction," the lateral direction of the vehicle 101 is taken as a "Y-direction," and the vertical direction of the vehicle 101 is taken as a "Z-direction." The XY-plane is the horizontal plane of the vehicle 101. The direction of the arrow in the X-direction (front) also is called the "+X direction," and the opposite direction (back) also is called the "−X direction." The direction of the arrow in the Y-direction (left) also is called the "+Y direction," and the opposite direction (right) also is called the "−Y direction." The direction of the arrow in the Z-direction (up) also is called the "+Z direction," and the opposite direction (down) also is called the "−Z direction."

First Display Device

Figure 3:
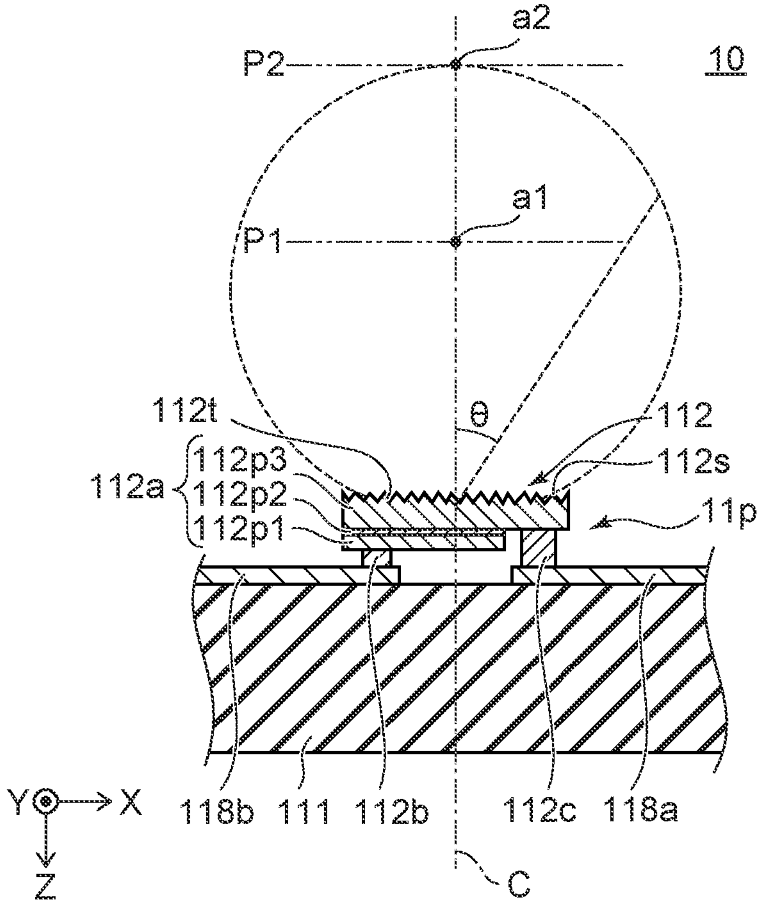
FIG. 3 is an end view showing a portion of the first display device of the image display device according to the first embodiment.

FIG. 3 is an end view showing a portion of a first display device of an image display device according to the present embodiment.

As shown in FIG. 1, the first display device 10 emits light roughly in the −Z direction. The light forms the first image IM1. As described below, the light L1 that is emitted from the first display device 10 has a substantially Lambertian light distribution.

The first display device 10 is, for example, an LED display including multiple LED (Light-Emitting Diode) elements. In the first display device 10, multiple LED elements 112 such as that shown in FIG. 3 are arranged in a matrix configuration. One or multiple LED elements 112 correspond to pixels 11*p* of the first display device 10.

In the first display device 10, each LED element 112 is mounted face-down on a substrate 111. However, each LED element may be mounted face-up on the substrate. Each LED element 112 includes a semiconductor stacked body 112*a*, an anode electrode 112*b*, and a cathode electrode 112*c*.

The semiconductor stacked body 112*a* includes a p-type semiconductor layer 112*p*1, an active layer 112*p*2 located on the p-type semiconductor layer 112*p*1, and an n-type semiconductor layer 112*p*3 located on the active layer 112*p*2. The semiconductor stacked body 112*a* includes, for example, a gallium nitride compound semiconductor of $In_XAl_YGa_{1-X-Y}N$ ($0 \leq X$, $0 \leq Y$, and $X+Y<1$). According to the present embodiment, the light that is emitted by the LED element 112 is visible light.

The anode electrode 112*b* is electrically connected to the p-type semiconductor layer 112*p*1. Also, the anode electrode 112*b* is electrically connected to a wiring part 118*b*. The cathode electrode 112*c* is electrically connected to the n-type semiconductor layer 112*p*3. Also, the cathode electrode 112*c* is electrically connected to another wiring part 118*a*. The electrodes 112*b* and 112*c* can include, for example, a metal material.

According to the present embodiment, multiple recesses 112*t* are provided in a light-emitting surface 112*s* of each LED element 112. In the specification, "the light-emitting surface of the LED element" means the surface of the LED element that mainly emits the light that is incident on the imaging optical system 30. According to the present embodiment, the surface of the n-type semiconductor layer 112*p*3 that is positioned at the side opposite to the surface facing the active layer 112*p*2 corresponds to the light-emitting surface 112*s*.

Hereinbelow, the optical axis of the light emitted from each LED element 112 is called simply an "optical axis C". The optical axis C is, for example, a straight line that connects a point a1 in a first plane P1 and a point a2 in a second plane P2, wherein the first plane P1 is positioned at the light-emitting side of the first display device 10 and parallel to the emission plane in which the multiple pixels 11*p* are arranged, the luminance is a maximum at the point a1 in the range in which the light is irradiated from one pixel 11*p*, the second plane P2 is parallel to the emission plane and separated from the first plane P1, and the luminance is a maximum at the point a2 in the range in which the light is irradiated from the LED element 112. For example, if the luminance has maxima at multiple points, the center of the points may be used as the maximum luminance point. From the perspective of productivity, it is desirable for the optical axis C to be orthogonal to the emission plane.

By providing the multiple recesses 112*t* in the light-emitting surface 112*s* of each LED element 112, the light that is emitted from each LED element 112, i.e., the light that is emitted from each pixel 11*p*, has a substantially Lambertian light distribution as shown by the broken line in FIG. 3. Herein, "the light emitted from each pixel has a substantially Lambertian light distribution" means that the luminous intensity in the direction of an angle θ with respect to the optical axis C of each pixel has a light distribution pattern that can be approximated by $\cos^n\theta$ times the luminous intensity at the optical axis C, wherein n is a value greater than 0. Here, it is favorable for n to be not more than 11, and more favorably 1. Although many planes including the optical axis C of the light emitted from one pixel 11*p* exist, the light distribution pattern of the light emitted from the pixel 11*p* has a substantially Lambertian light distribution in each plane, and the numerical values of n are substantially equal.

However, the configuration of each LED element is not limited to that described above. For example, multiple protrusions instead of multiple recesses may be provided in the light-emitting surface of each LED element, or both multiple recesses and multiple protrusions may be provided. When the growth substrate is light-transmissive, the growth substrate may not be detached from the semiconductor stacked body; multiple recesses and/or multiple protrusions may be provided in the surface of the growth substrate corresponding to the light-emitting surface. In such configurations as well, the light that is emitted from each LED element has a substantially Lambertian light distribution. Also, in each LED element, an n-type semiconductor layer may be provided to face the substrate; an active layer and a p-type semiconductor layer may be stacked in this order on the n-type semiconductor layer; the surface of the p-type semiconductor layer at the side opposite to the surface facing the active layer may be used as the light-emitting surface of the LED element. It is sufficient for the light finally emitted from each pixel to have a substantially Lambertian light distribution, and the light that is emitted from each LED element may not have a substantially Lambertian light distribution.

Second Display Device

The second display device 20 emits the light L2 in a direction to be transmitted by the optical member 40 to reach the eyebox 201. In the example shown in FIG. 1, the second display device 20 emits the light L2 in a direction tilted slightly in the +Z direction (up) with respect to the −X direction (back). The light L2 forms the second image IM2.

The configuration of the second display device 20 is not particularly limited. For example, the second display device 20 may be a liquid crystal display. The second display device 20 may be an LED display similar to the first display device 10. The light L2 that is emitted from the second display device 20 may or may not have a substantially Lambertian light distribution.

Imaging Optical System

As shown in FIG. 1, the imaging optical system 30 includes the input element 31, the intermediate element 32, and the output element 33. The input element 31 is positioned at the −Z direction side of the first display device 10 and is arranged to face the display surface of the first display device 10. The input element 31 is a mirror that includes a concave mirror surface 31*a*. The input element 31 reflects the light L1 emitted from the first display device 10.

The intermediate element 32 is positioned at the −X/+Z direction side of the input element 31, and is arranged to face the input element 31. The intermediate element 32 is a mirror that includes a concave mirror surface 32*a*. The intermediate element 32 further reflects the light L1 reflected by the input element 31.

The input element 31 and the intermediate element 32 are included in a bending part 36 that bends multiple chief rays L emitted from mutually-different positions of the first display device 10 to be substantially parallel to each other. According to the present embodiment, the mirror surfaces 31*a* and 32*a* are biconic surfaces. However, the mirror surfaces 31*a* and 32*a* may be portions of spherical surfaces or may be freeform surfaces.

The output element 33 is positioned at the +X direction side of the first display device 10, the input element 31, and the intermediate element 32 and is arranged to face the intermediate element 32. The output element 33 is a mirror including a flat mirror surface 33*a*. The output element 33 reflects, toward the formation position P of the real image IM11, the light traveling via the input element 31 and the intermediate element 32. Specifically, the multiple chief rays L that are caused to be substantially parallel by the bending part 36 are incident on the output element 33. The mirror surface 33*a* is oblique to the horizontal plane of the vehicle 101, i.e., the XY-plane, to be oriented in the −Z direction along the +X direction. Accordingly, the output element 33 reflects the light reflected by the intermediate element 32 in a direction oblique to the Z-direction to be oriented in the −Z direction along the +X direction. Thus, the output element 33 is included in a direction modifying part 37 that modifies the directions of the multiple chief rays L so that the multiple chief rays L caused to be substantially parallel by the bending part 36 are oriented toward the formation position P of the real image IM11.

The input element 31, the intermediate element 32, and the output element 33 each may include a main member made of glass, a resin material, or the like and a reflective film that forms the mirror surfaces 31*a*, 32*a*, and 33*a* located at the surface of the main member and is made of a metal film, a dielectric multilayer film, or the like. The input element 31, the intermediate element 32, and the output element 33 each may be entirely made of a metal material.

The light L1 that is emitted from the first display device 10 is incident on the imaging optical system 30, and the imaging optical system 30 forms the real image IM11 corresponding to the first image IM1. The imaging optical system 30 is an optical system that includes all optical elements necessary for forming the real image IM11 at the prescribed position. The intermediate element 32 may not be included in the imaging optical system 30. The light that travels via the input element 31 is incident on the output element 33 regardless of whether or not the intermediate element 32 exists.

The imaging optical system 30 is substantially telecentric at the real image IM11 side. Herein, "the imaging optical system 30 is substantially telecentric at the real image IM11 side" means that the multiple chief rays L that are emitted from mutually-different positions of the first display device 10, travel via the imaging optical system 30, and reach the real image IM11 are substantially parallel to each other before and after the real image IM11. "Different positions" refers to, for example, different pixels 11*p*. "The multiple chief rays L being substantially parallel to each other" means being substantially parallel in a practical range that allows error such as the manufacturing accuracy, assembly accuracy, etc., of the components of the light source unit 50. When "the multiple chief rays L are substantially parallel to each other", for example, the angle between the chief rays L is not more than 10 degrees.

When the imaging optical system 30 is substantially telecentric at the real image IM11 side, the multiple chief rays L cross each other before being incident on the input element 31. Hereinbelow, the point at which the multiple chief rays L cross each other is called a "focal point F". Therefore, for example, whether or not the imaging optical system 30 is substantially telecentric at the real image IM11 side can be confirmed by utilizing the backward propagation of light by the following method. First, a light source that can emit parallel light such as a laser light source or the like is provided at the vicinity of the position P at which the real image IM11 is formed. The light that is emitted from the light source is irradiated on the output element 33 of the imaging optical system 30. The light that is emitted from the light source and travels via the output element 33 is incident on the input element 31 via the intermediate element 32. Then, if the light that is emitted from the input element 31 condenses at a point, i.e., the focal point F, before reaching the first display device 10, then the imaging optical system 30 can be determined to be substantially telecentric at the real image IM11 side.

Because the imaging optical system 30 is substantially telecentric at the real image IM11 side, the light that is emitted from each pixel 11*p* that is mainly incident on the imaging optical system 30 is the light that passes through the focal point F and the vicinity of the focal point F.

The configuration and position of the coupling optical system are not limited to those described above as long as the coupling optical system is substantially telecentric at the real image side. For example, the number of optical elements included in the direction modifying part may be two or more.

Optical Member

It is sufficient for the optical member 40 to be a member that can reflect the light L1 emitted from the first display device 10 and transmit the light L2 emitted from the second display device 20. For example, the optical member 40 may be formed of a transparent plate, and the space, e.g., the interior of the dashboard 105, at the side at which the second display device 20 is located when viewed from the optical member 40 may be dark. The optical member 40 may have a curved plate shape concave toward the first display device 10 side.

When the optical member 40 has a plate shape, the optical member 40 may include two transparent plates, and a transparent resin layer located between the transparent plates. In such a case, the transparent resin layer may be a wedge-shaped film of which the thickness changes continuously. As a result, when viewed by the viewer 200, the light L1 that is reflected by the front surface of the optical member 40 and the light L1 that is reflected by the back surface of the optical member 40 are aligned, and the virtual image IM12 can be viewed with high resolution.

Or, the optical member 40 may be a reflective polarizing plate. In such a case, the optical member 40 reflects the incident light L1 with one polarization, and transmits the incident light L2 with the other polarization.

Effects

According to the image display device 1 according to the present embodiment, images of mutually-different focal lengths can be displayed. As shown in FIG. 2, the viewer 200 can view two types of images at mutually-different distances, that is, the second image IM2 and the virtual image IM12 corresponding to the first image IM1. Therefore, the viewer 200 can view a three-dimensional image by simultaneously displaying the virtual image IM12 and the second image IM2.

Also, according to the present embodiment, the imaging optical system 30 can be small and can display a high-quality image because the imaging optical system 30 is substantially telecentric at the real image IM11 side. This effect is described in detail below.

Figure 4A:
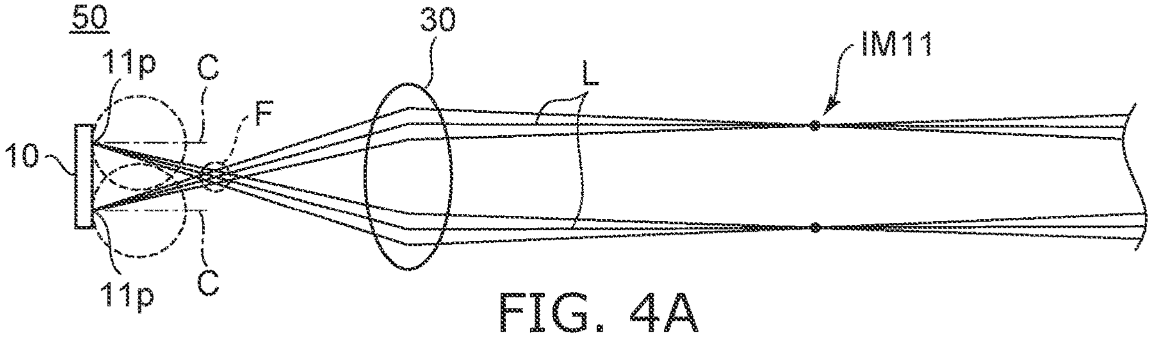
FIG. 4A is a schematic view showing a principle of a light source unit according to the first embodiment.

FIG. 4A is a schematic view showing the principle of a light source unit according to the present embodiment.

Figure 4B:
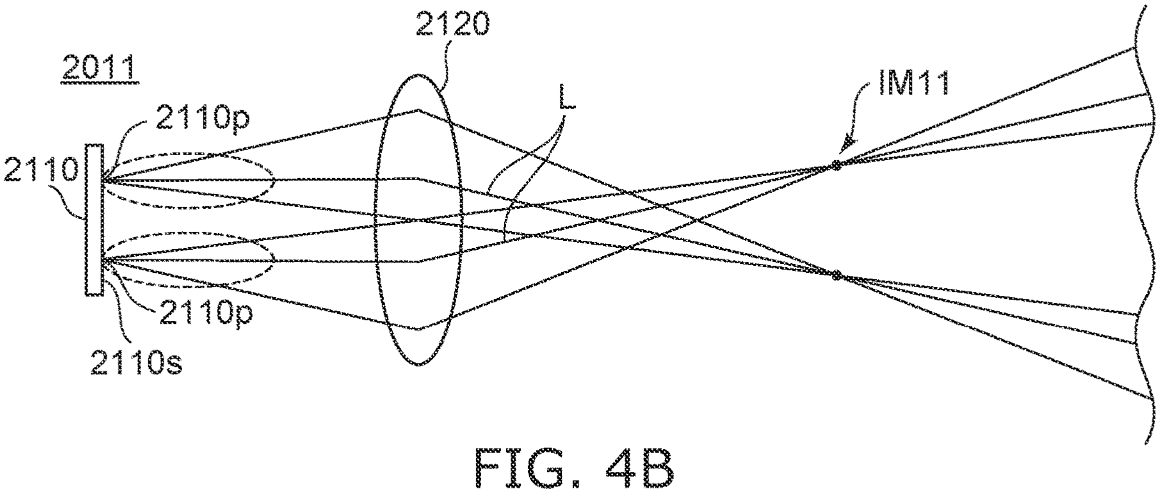
FIG. 4B is a schematic view showing a principle of a light source unit according to a reference example.

FIG. 4B is a schematic view showing the principle of a light source unit according to a reference example.

Optical characteristics of the reference example are described below.

In the light source unit 2011 according to the reference example shown in FIG. 4B, a display device 2110 is an LCD (Liquid Crystal Display) that includes multiple pixels 2110*p*. In FIG. 4A, the light distribution pattern of the light emitted from two pixels 11*p* among the multiple pixels 11*p* of the first display device 10 according to the present embodiment are illustrated by broken lines. Similarly, in FIG. 4B, the light distribution pattern of the light emitted from two pixels 2110*p* among the multiple pixels 2110*p* of the display device 2110 of the reference example are illustrated by broken lines. The imaging optical systems 30 and 2120 are shown in simplified form in FIGS. 4A and 4B.

In the display device 2110 of the reference example as shown in FIG. 4B, the light that is emitted from each pixel 2110*p* is mainly distributed in the normal direction of a light-emitting surface 2110*s*. Although many planes that include the optical axis of the light emitted from one pixel 2110*p* exist, in the display device 2110 which is an LCD, the light distribution patterns of the light emitted from one pixel 2110*p* are different from each other between the planes. In one plane among the multiple planes, the light that is emitted from the pixels 2110*p* has a light distribution pattern in which the luminous intensity in the direction of the angle θ with respect to the optical axis is approximated by $\cos^{20}\theta$ times the luminous intensity at the optical axis.

In such a display device 2110, the luminous intensity and/or chromaticity of the light changes according to the viewing angle of the viewer, even when the light is emitted from the same position of the display device 2110. Accordingly, even when the luminance of the light emitted from all of the pixels is uniform, the luminance and/or chromaticity of the real image IM11 fluctuate if the imaging optical system 2120 receives the light emitted from the display device 2110 from directions other than the normal direction. In other words, the quality of the real image IM11 degrades. Accordingly, to prevent degradation of the quality of the real image IM11, it is necessary to receive the light emitted from the pixels 2110*p* of the display device 2110 from the normal direction. As a result, the imaging optical system 2120 is larger.

In contrast, according to the present embodiment, the imaging optical system 30 is substantially telecentric at the real image IM11 side, and the light emitted from the first display device 10 has a substantially Lambertian light distribution. Therefore, the quality of the real image IM11 can be improved while downsizing the imaging optical system 30.

Specifically, because the light emitted from the first display device 10 has a substantially Lambertian light distribution, the dependence on the angle of the luminous intensity and/or chromaticity of the light emitted from the pixels 11*p* of the first display device 10 is less than the dependence on the angle of the luminous intensity and/or chromaticity of the light emitted from the pixels 2110*p* of the display device 2110 of the reference example. In particular, as an exact Lambertian light distribution is approached, that is, as the approximation formula of the light distribution pattern approaches $\cos^{n}\theta$ in which n is 1, the luminous intensity and/or chromaticity of the light emitted from the pixels 11*p* of the first display device 10 is substantially uniform regardless of the angle. Therefore, as shown in FIG. 4A, even when the imaging optical system 30 receives light passing through the focal point F, that is, light from a direction other than the normal direction, the fluctuation of the luminance and/or chromaticity of the real image IM11 can be suppressed, and the quality of the real image IM11 can be improved.

Because the imaging optical system 30 forms the real image IM11 mainly with light passing through the focal point F, an increase of the light diameter of the light incident on the imaging optical system 30 can be suppressed. As a result, the input element 31 can be smaller. Furthermore, the multiple chief rays L that are emitted from the output element 33 are substantially parallel to each other. The multiple chief rays L emitted from the output element 33 being substantially parallel to each other means that the irradiation range of the light of the output element 33 contributing to image formation is substantially the same as the size of the real image IM11. Therefore, the output element 33 of the imaging optical system 30 also can be smaller. Thus, the imaging optical system 30 that is small and can form a high-quality real image IM11 can be provided.

The real image IM11 is formed between the imaging optical system 30 and the optical member 40. In such a case, the light that is emitted from one point of the first display device 10 is condensed at the formation position of the real image IM11 after traveling via the output element 33. On the other hand, when the real image IM11 is not formed between the imaging optical system 30 and the optical member 40, the light diameter of the light emitted from one point of the first display device 10 gradually spreads from the input element 31 toward the optical member 40. Accordingly, in the output element 33 according to the present embodiment, the irradiation range of the light emitted from one point of the first display device 10 can be smaller than when the real image IM11 is not formed. Therefore, the output element 33 can be smaller.

Because the imaging optical system 30 according to the present embodiment is small, the light source unit 50 including the first display device 10 and the imaging optical system 30 can be easily located in the limited space inside the vehicle 101.

According to the present embodiment, unlike a general head-up display (HUD) in which the virtual image is visible depthward of the front windshield 104, the virtual image IM12 and the second image IM2 are visible depthward of the optical member 40 positioned lower than the front windshield 104. In other words, in the automobile 100, the viewer 200 can view the virtual image IM12 and the second image IM2 at a lower position than the front windshield 104 because the optical member 40 is located lower than the front windshield 104. Therefore, the likelihood of degradation of the visibility of the virtual image IM12 and the second image IM2 due to bright scenery outside the vehicle is low, and the information displayed by the virtual image IM12 and the second image IM2 is transferred to the viewer 200 more easily. For example, a transparent protective screen or the like may be mounted frontward of the optical member 40.

According to the present embodiment, the imaging optical system 30 includes the bending part 36 and the direction modifying part 37. Thus, the design of the imaging optical system 30 is made easier by separating the part of the imaging optical system 30 having the function of making the chief rays L parallel to each other and the part of the imaging optical system 30 forming the real image IM11 at the desired position.

A portion of the optical path inside the imaging optical system 30 extends in a direction crossing the XY-plane orthogonal to the Z-direction. Therefore, the imaging optical system 30 can be somewhat smaller in directions along the XY-plane.

Another portion of the optical path inside the imaging optical system 30 extends in a direction along the XY-plane orthogonal to the Z-direction. Therefore, the imaging optical system 30 can be somewhat smaller in the Z-direction.

EXAMPLES

Image display devices according to examples and a reference example will now be described.

Figure 5:
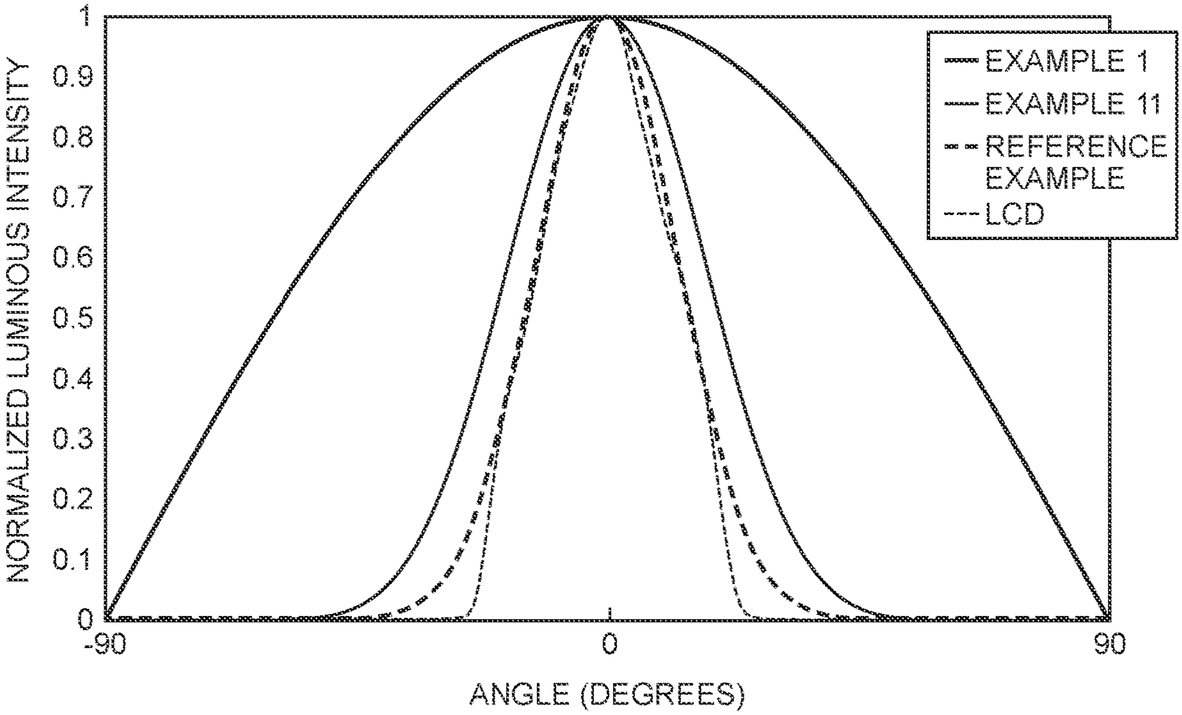
FIG. 5 is a graph showing light distribution patterns of lights emitted from one light-emitting area for examples 1 and 11 and the reference example.

FIG. 5 is a graph showing a light distribution pattern of light emitted from one light-emitting area for examples 1 and 11 and the reference example.

Figure 6:
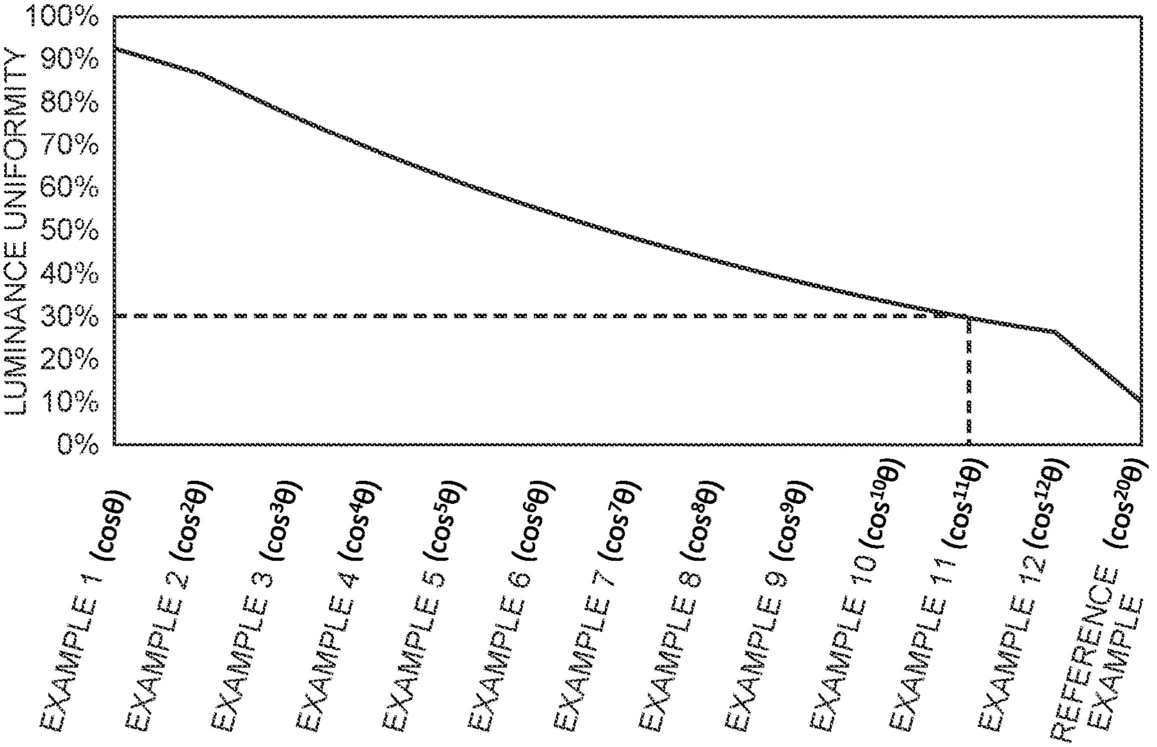
FIG. 6 is a graph showing uniformity of luminance of virtual image for the examples 1 to 12 and the reference example.

FIG. 6 is a graph showing the uniformity of the luminance of the virtual image for the examples 1 to 12 and the reference example.

The image display devices according to the examples 1 to 12 and the reference example were set in the simulation software to include a first display device, an imaging optical system, and an optical member, in which the first display device included multiple light-emitting areas arranged in a matrix configuration. The light-emitting areas correspond to the pixels 11*p* of the first display device 10 according to the first embodiment.

In FIG. 5, the horizontal axis is the angle with respect to the optical axis of the light-emitting area, and the vertical axis is the luminous intensity at the angle, normalized by dividing by the luminous intensity at the optical axis. As shown in FIG. 5, the display device according to the example 1 was set in the simulation software so that the light emitted from each light-emitting area had a light distribution pattern in which the luminous intensity in the direction of the angle θ with respect to the optical axis was represented by cos θ times the luminous intensity at the optical axis. In other words, according to the example 1, the light that was emitted from each light-emitting area had an exact Lambertian light distribution.

In the examples 2 to 12, the light that was emitted from each light-emitting area was set in the simulation software to have a light distribution pattern in which the luminous intensity in the direction of the angle θ with respect to the optical axis was represented by $\cos^n\theta$ times the luminous intensity at the optical axis. According to the example 2, n=2, and n was set to increase by one in order from the example 2 to the example 12.

By investigating the light distribution pattern in one plane of the light emitted from the pixels of an LCD, the light distribution pattern was found to be similar to the light distribution pattern illustrated by the fine broken line in FIG. 5. As described above, it was found that the luminous intensity in the direction of the angle θ with respect to the optical axis in the light distribution pattern can be approximated by a light distribution pattern represented by $\cos^{20}\theta$ times the luminous intensity at the optical axis. Therefore, in the reference example, the luminous intensity in the direction of the angle θ with respect to the optical axis of each light-emitting area was set in the simulation software to have the light distribution pattern represented by $\cos^{20}\theta$ times the luminous intensity at the optical axis.

The imaging optical systems of the examples 1 to 12 and the reference example each were set to be telecentric at the real image side.

Then, the luminance distribution of the virtual image IM12 formed when the luminance was constant for all of the light-emitting areas was simulated for the examples 1 to 12 and the reference example. In this case, the virtual image IM12 was a rectangle having a long side of 111.2 mm and a short side of 27.8 mm. Also, in this case, the plane in which the virtual image IM12 was formed was divided into square areas having sides of 1 mm, and the luminance value of each area was simulated. Then, the uniformity of the luminance of the virtual image IM12 was evaluated. Herein, "the uniformity of the luminance" was the value of the ratio of the minimum value to the maximum value of the luminance inside the virtual image IM12 expressed in percent. The results are shown in FIG. 6. In FIG. 6, the horizontal axis is the examples, and the vertical axis is the uniformity of the luminance.

As shown in FIG. 6, it was found that the uniformity of the luminance degraded as n increased. This was because the luminance at positions separated from the center of the virtual image IM12 decreased as n increased. In particular, it was found that the uniformity of the luminance was 30% for the example 11, that is, when n=11. It is considered that it is sufficient for the uniformity of the luminance of the virtual image IM12 to be not less than 30% so that the viewer can easily discriminate between the virtual image IM12 and the regions at which the virtual image IM12 was not formed.

Accordingly, it was found that when the imaging optical system is configured to be substantially telecentric, it is favorable for the light L1 emitted from the first display device 10 to have a substantially Lambertian light distribution to suppress the uneven luminance of the real image IM11 and the virtual image IM12. Specifically, it was found that it is favorable for n of $\cos^n\theta$ which is the approximation formula of the light distribution pattern to be not more than 11, and more favorably 1. Although the uniformity of the luminance of the virtual image IM12 degrades as n deviates from 1 as described above, a prescribed luminance distribution can be preset in the display luminance of the first display device 10 to remedy such nonuniformity of the luminance. For example, when the luminance at the outer edge portion of the virtual image IM12 tends to be less than the luminance at the central portion due to the light emitted from the pixels 11*p* of the first display device 10 traveling via the imaging optical system 30, the first display device 10 may control the outputs of the LED elements 112 of the pixels 11*p* at the outer edge vicinity of the first display device 10 to be greater than the outputs of the LED elements 112 of the pixels 11*p* at the center.

First Modification of First Embodiment

Figure 7A:
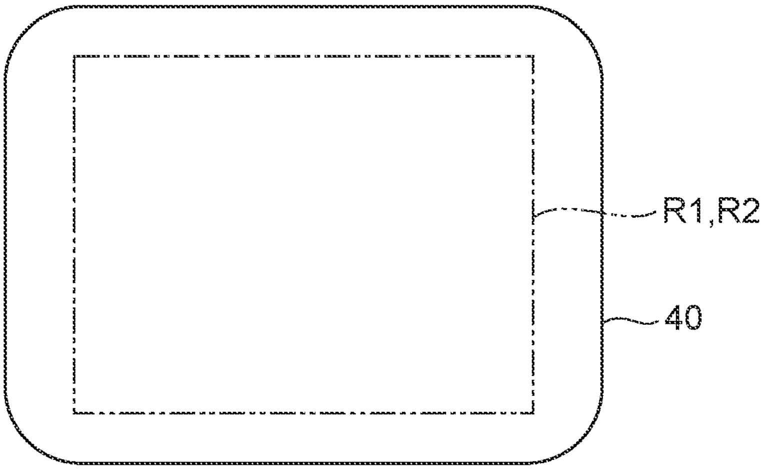
FIG. 7A shows an optical member according to a first modification of the first embodiment.

FIG. 7A shows an optical member according to the modification.

In the optical member 40 according to the modification as shown in FIG. 7A, the first region R1 that reflects the light L1 emitted from the imaging optical system 30 and the second region R2 that transmits the light L2 emitted from the second display device 20 are aligned. In other words, the entire first region R1 and the entire second region R2 overlap.

The viewer 200 views both the second image IM2 and the virtual image IM12 corresponding to the first image IM1 in the same region of the optical member 40. The first display device 10 and the second display device 20 can be used together to display one three-dimensional image as an entirety. Otherwise, the configuration, operations, and effects according to the modification are similar to those of the first embodiment.

Second Modification of First Embodiment

Figure 7B:
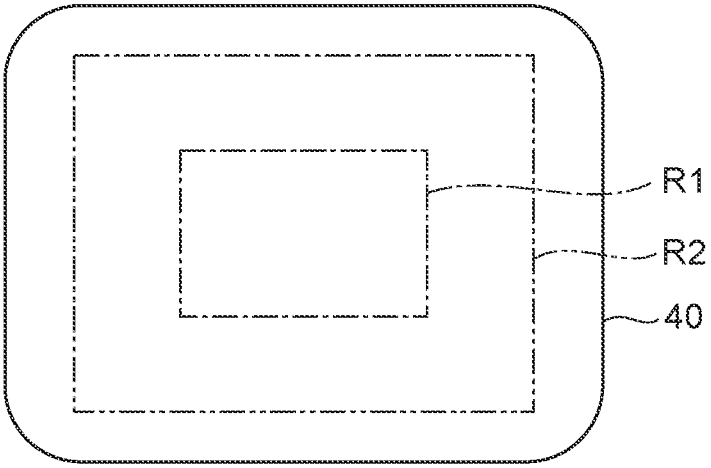
FIG. 7B shows an optical member of a second modification of the first embodiment.

FIG. 7B shows an optical member of the modification.

In the optical member 40 according to the modification as shown in FIG. 7B, the first region R1 is positioned inside the second region R2. A three-dimensional image having a deep interior can be displayed thereby. Otherwise, the configuration, operations, and effects according to the modification are similar to those of the first embodiment.

Third Modification of First Embodiment

Figure 7C:
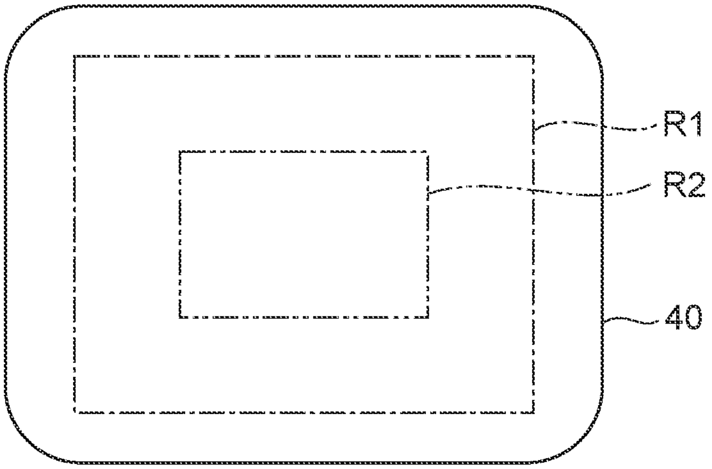
FIG. 7C shows an optical member according to a third modification of the first embodiment.

FIG. 7C shows an optical member according to the modification.

In the optical member 40 according to the modification as shown in FIG. 7C, the second region R2 is positioned inside the first region R1. A three-dimensional image in which the interior protrudes frontward can be displayed thereby. Otherwise, the configuration, operations, and effects according to the modification are similar to those of the first embodiment.

Fourth Modification of First Embodiment

Figure 7D:
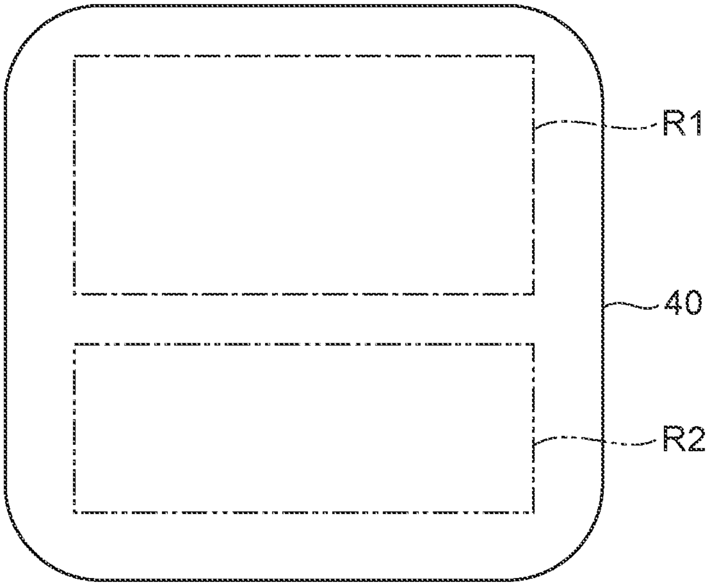
FIG. 7D shows an optical member according to a fourth modification of the first embodiment.

FIG. 7D shows an optical member according to the modification.

In the optical member 40 according to the modification as shown in FIG. 7D, the first region R1 and the second region R2 are separated. As a result, the virtual image IM12 and the second image IM2 do not interfere. Therefore, the first image IM1 and the second image IM2 can be mutually-independent images. Also, an image can be displayed using the entire first and second regions R1 and R2. Otherwise, the configuration, operations, and effects according to the modification are similar to those of the first embodiment.

Fifth Modification of First Embodiment

Figure 8:
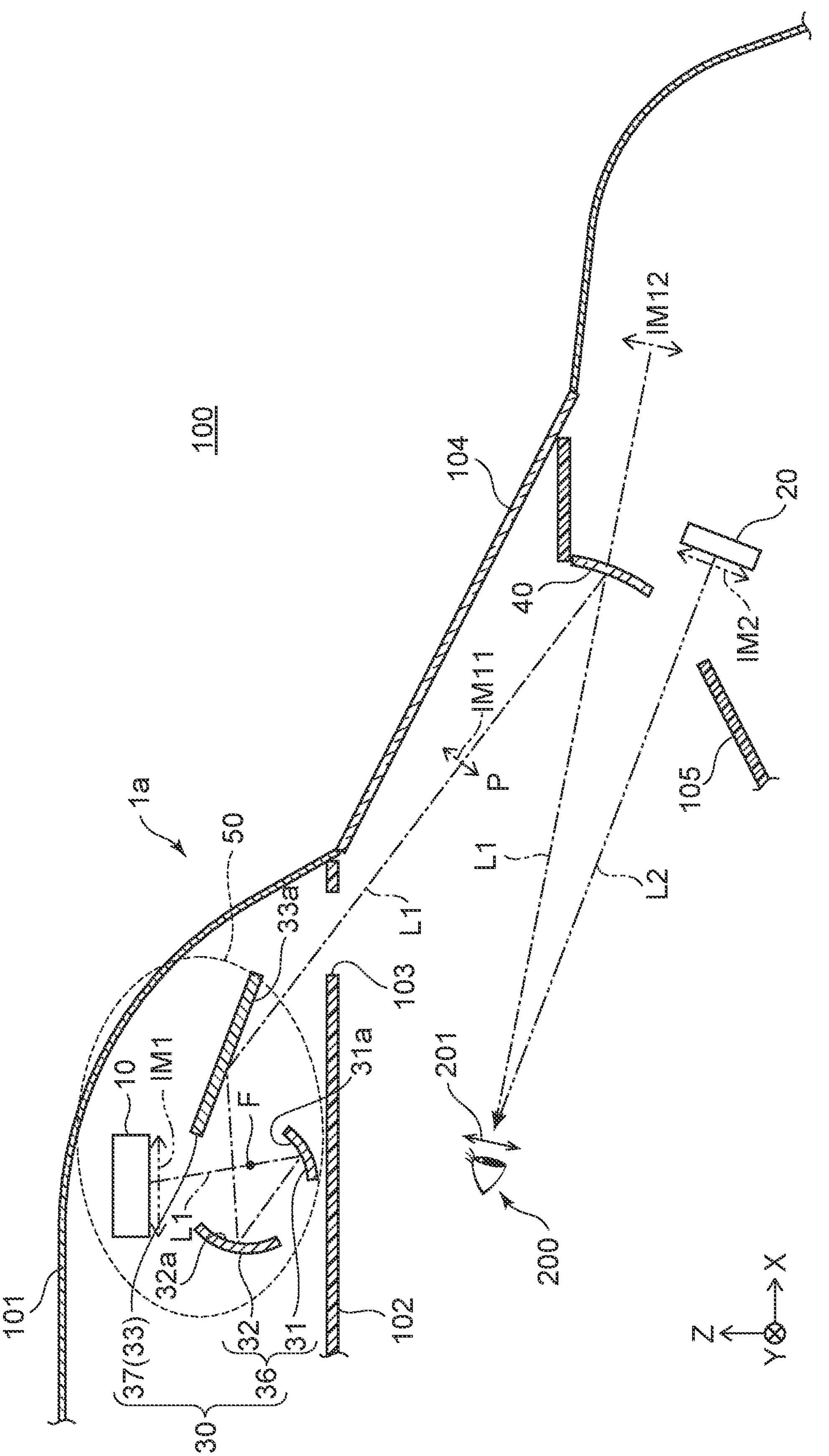
FIG. 8 is an end view showing an image display device according to a fifth modification of the first embodiment.

FIG. 8 is an end view showing an image display device according to the modification.

In the image display device 1*a* according to the modification as shown in FIG. 8, the optical member 40 is not interposed between the second display device 20 and the eyebox 201. Therefore, the light L2 that is emitted from the second display device 20 directly reaches the eyebox 201 without passing through the optical member 40. Accordingly, the optical member 40 can be configured specifically for efficiently reflecting the light L1 without considering the transmission of the light L2. For example, the optical member 40 can be a light-reflecting member such as a mirror, etc.

As a result, according to the image display device 1*a*, a high-definition virtual image IM12 can be displayed, and a high-definition second image IM2 also can be displayed because the second image IM2 is not transmitted by the optical member 40. A protective screen or the like that is highly light-transmissive may be provided in front of the second display device 20. The second display device 20 or the protective screen may be formed to have a continuous body with the dashboard 105. Otherwise, the configuration, operations, and effects according to the modification are similar to those of the first embodiment.

Second Embodiment

Figure 9:
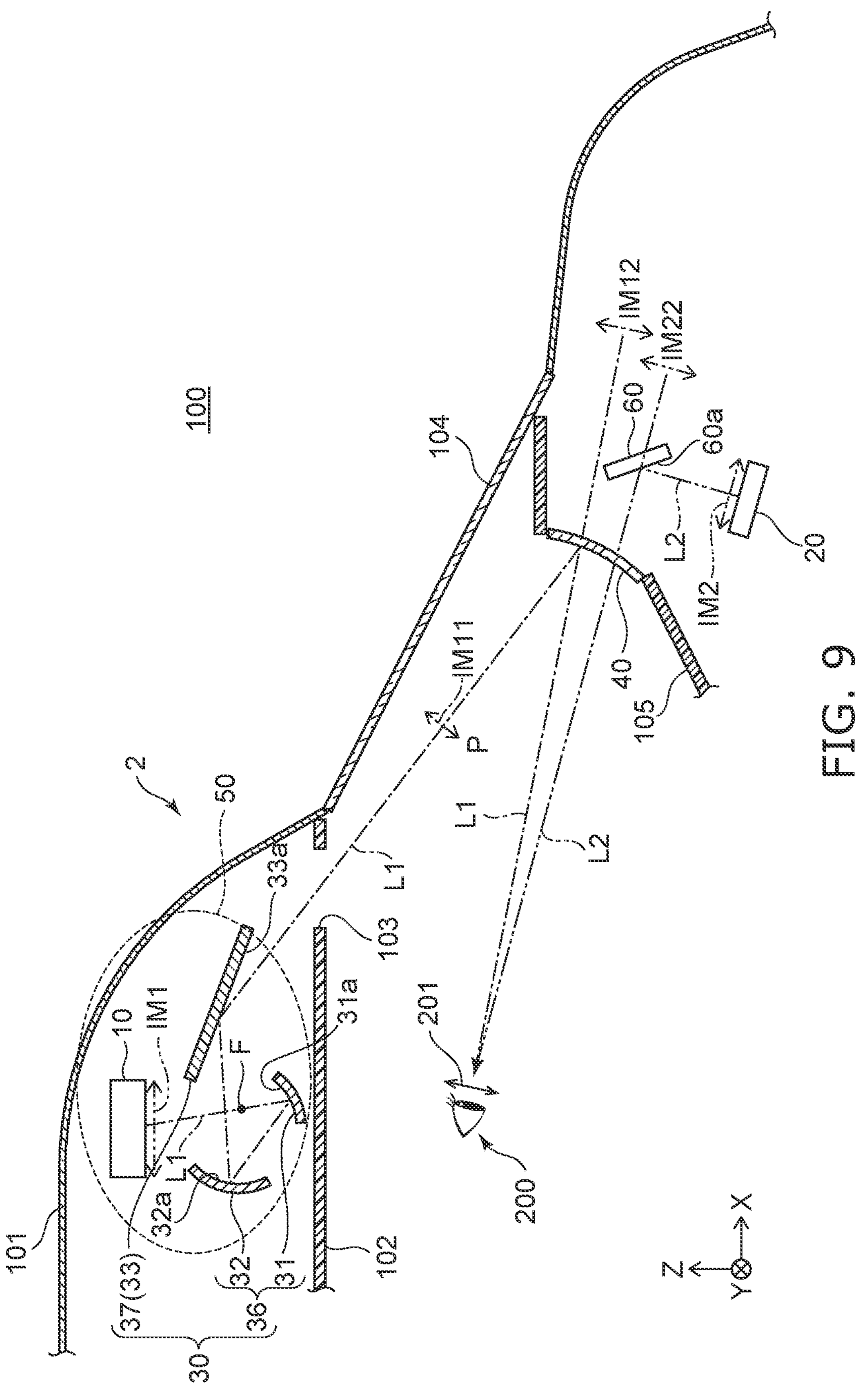
FIG. 9 is an end view showing an image display device according to a second embodiment.

FIG. 9 is an end view showing an image display device according to the present embodiment.

As shown in FIG. 9, the image display device 2 according to the present embodiment further includes a reflecting member 60 that reflects the light L2 emitted from the second display device 20 toward the optical member 40 in addition to the configuration of the image display device 1 according to the first embodiment. The reflecting member 60 is a mirror including a mirror surface 60*a*.

The reflecting member 60 may include a main member made of glass, a resin material, or the like and a reflective film that forms the mirror surface 60*a* located at the surface of the main member, is made of a metal film, a dielectric multilayer film, or the like, and may be formed to have a continuous body from a metal material. The mirror surface 60*a* may be a concave surface or convex surface. The mirror surface 60*a* may be a biconic surface, may be a portion of a spherical surface, or may be a freeform surface.

Compared with the first embodiment, the position and angle of the second display device 20 according to the present embodiment are different. Namely, the reflecting member 60 according to the present embodiment is located at the position at which the second display device 20 is located according to the first embodiment. The second display device 20 is located at the −Z direction side (the lower side) of the reflecting member 60.

The second display device 20 emits the light L2 toward the reflecting member 60. The light L2 that is emitted from the second display device 20 is reflected by the mirror surface 60*a* of the reflecting member 60, is transmitted by the optical member 40, and reaches the eyebox 201. As a result, the viewer 200 can view a virtual image IM22 corresponding to the second image IM2 depthward of the optical member 40.

According to the present embodiment, the second image IM2 that is displayed by the second display device 20 can form the virtual image IM22 that is enlarged by the reflecting member 60. As a result, the second display device 20 can be smaller. The optical path length from the second display device 20 to the eyebox 201 can be arbitrarily set, and so the distance to the virtual image IM22 when viewed by the viewer 200 can be arbitrarily selected. Because the second display device 20 can be smaller and the degrees of freedom of the position and angle of the second display device 20 can be increased, it is easier to arrange the second display device 20 in the limited space inside the vehicle 101. Otherwise, the configuration, operations, and effects according to the present embodiment are similar to those of the first embodiment.

Third Embodiment

Figure 10:
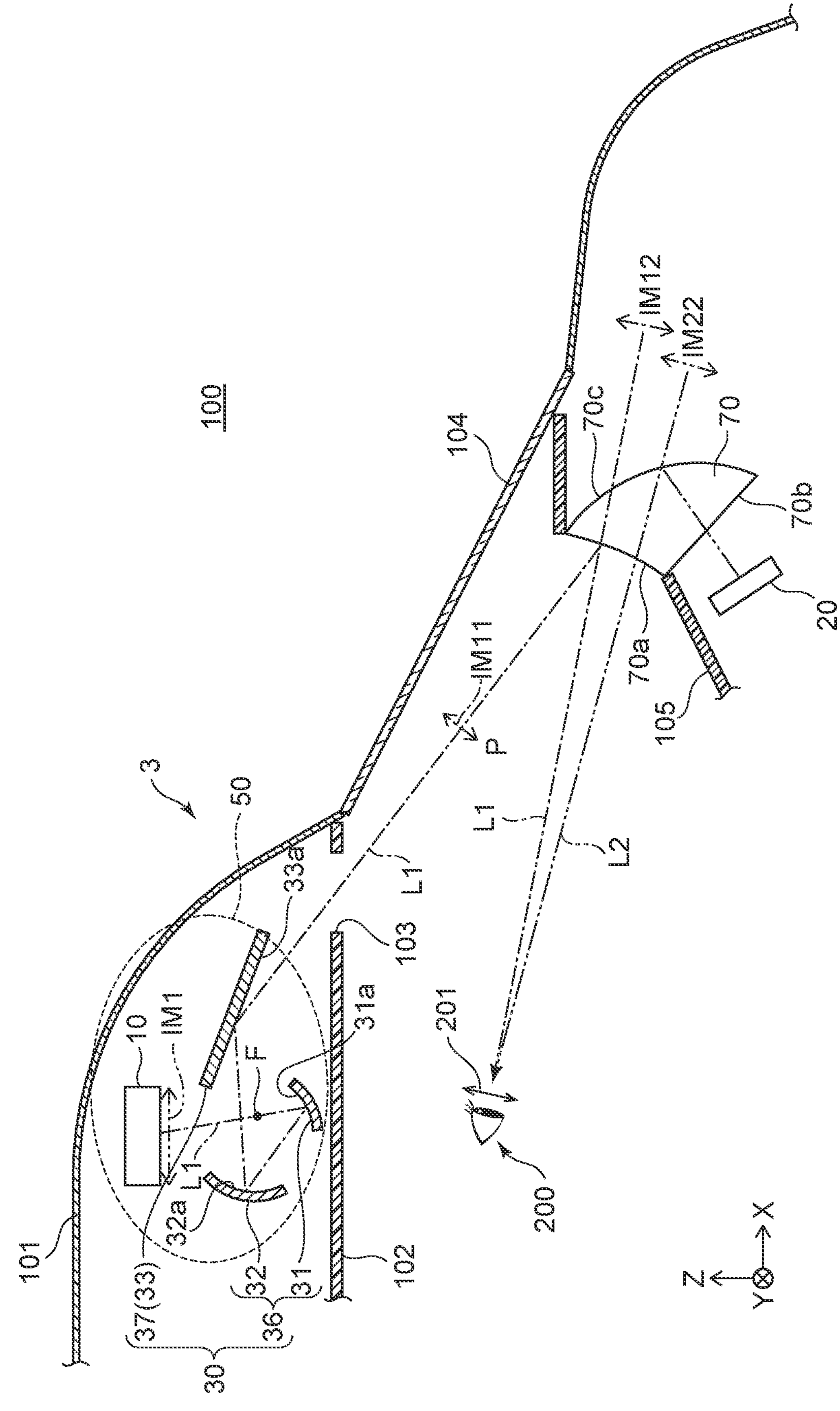
FIG. 10 is an end view showing an image display device according to a third embodiment.

FIG. 10 is an end view showing an image display device according to the present embodiment.

As shown in FIG. 10, the image display device 3 according to the present embodiment differs from the image display device 2 according to the second embodiment in that an optical member 70 is included instead of the optical member 40 and the reflecting member 60. The optical member 70 is made of a light-transmitting material such as glass, a transparent resin, or the like, and has a substantially prismatic shape. The optical member 70 includes a first surface 70*a*, a second surface 70*b*, and a third surface 70*c*.

The light L1 that is emitted from the imaging optical system 30 is incident on the first surface 70*a* of the optical member 70. The first surface 70*a* reflects, toward the eyebox 201, the light L1 incident from the imaging optical system 30. It is favorable for the first surface 70*a* to be a curved surface, e.g., a concave curved surface. The light L2 from the second display device 20 is incident on the second surface 70*b*. The second surface 70*b* transmits the light L2 incident from the second display device 20 and introduces the light L2 to the interior of the optical member 70. It is favorable for the second surface 70*b* to be a plane. The light L2 that is transmitted by the second surface 70*b* is incident on the third surface 70*c*. The third surface 70*c* reflects the light L2 incident from the second surface 70*b* toward the first surface 70*a*. It is favorable for the third surface 70*c* to be a curved surface, e.g., a convex curved surface.

According to the present embodiment, the light L1 that is emitted from the first display device 10 and travels via the imaging optical system 30 is reflected by the first surface 70*a* of the optical member 70 and reaches the eyebox 201 of the viewer 200. The light L2 that is emitted from the second display device 20 enters the interior of the optical member 70 through the second surface 70*b* of the optical member 70, is reflected by the third surface 70*c*, is emitted from the optical member 70 via the first surface 70*a*, and reaches the eyebox 201. As a result, the viewer 200 can view the virtual image IM12 corresponding to the first image IM1 and the virtual image IM22 corresponding to the second image IM2 depthward of the first surface 70*a* of the optical member 70. Thus, according to the present embodiment, the first surface 70*a* of the optical member 70 realizes the function of the optical member 40 according to the second embodiment, and the third surface 70*c* realizes the function of the reflecting member 60 according to the second embodiment.

According to the present embodiment, compared with the second embodiment, the image display device 3 can be smaller and less expensive because the optical member 40 and the reflecting member 60 can be configured using one optical member 70. Also, the quality of the image is stable because the positional relationship of the first and third surfaces 70*a* and 70*c* of the optical member 70 can be fixed. Otherwise, the configuration, operations, and effects according to the present embodiment are similar to those of the second embodiment.

Fourth Embodiment

Figure 11:
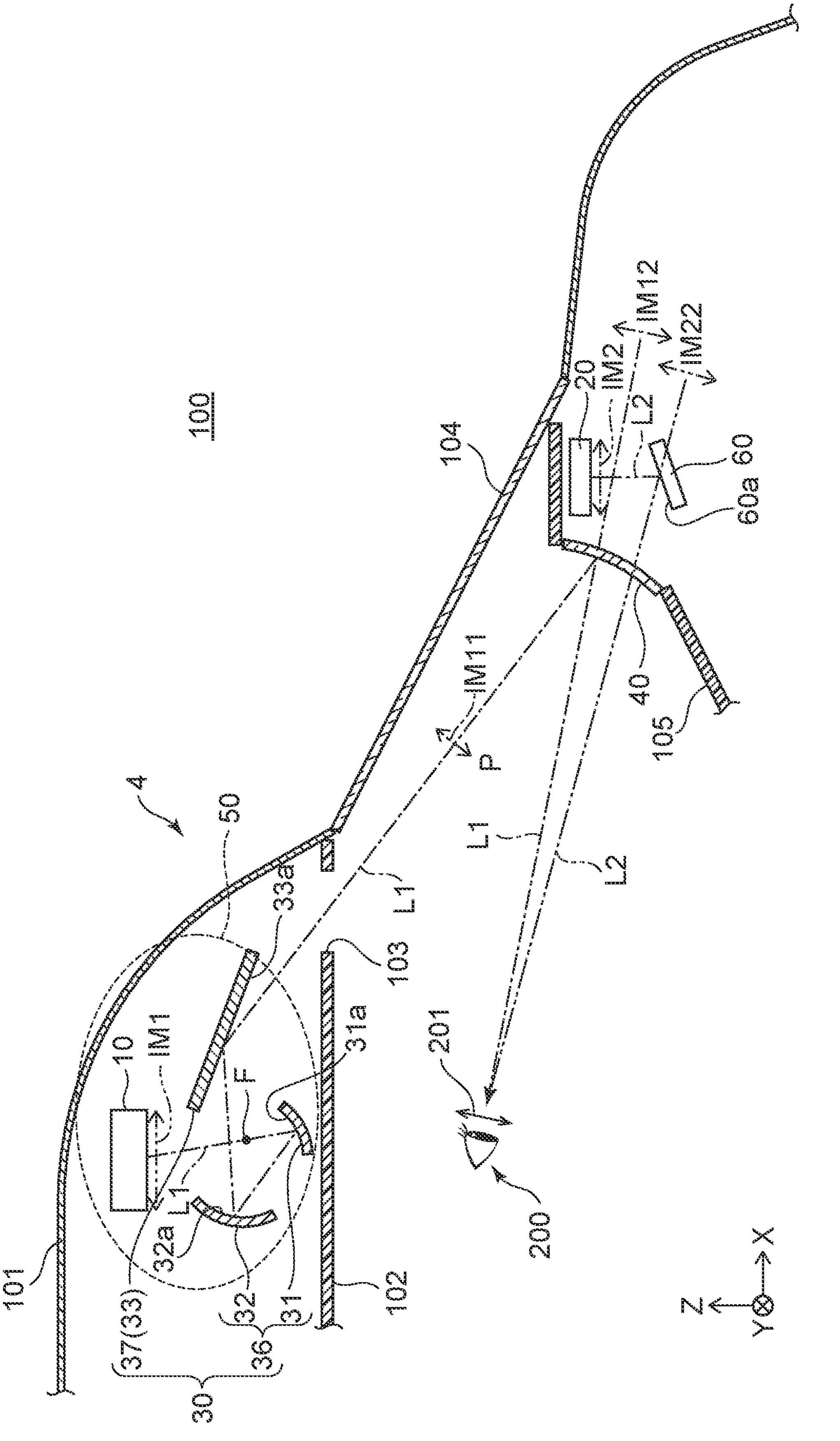
FIG. 11 is an end view showing an image display device according to a fourth embodiment.

FIG. 11 is an end view showing an image display device according to the present embodiment.

As shown in FIG. 11, the image display device 4 according to the present embodiment differs from the image display device 2 according to the second embodiment in that the second display device 20 is located at the +Z direction side (the upper side) of the reflecting member 60. The second display device 20 emits the light L2 substantially in the −Z direction (downward) toward the reflecting member 60.

According to the design of the automobile 100, it may be more favorable for the second display device 20 to be located at the +Z direction side (the upper side) than at the −Z direction side (the lower side) of the reflecting member 60. Otherwise, the configuration, operations, and effects according to the present embodiment are similar to those of the second embodiment. According to the present embodiment as well, similarly to the third embodiment, a prismatic optical member 70 may be provided instead of the optical member 40 and the reflecting member 60.

Fifth Embodiment

Figure 12:
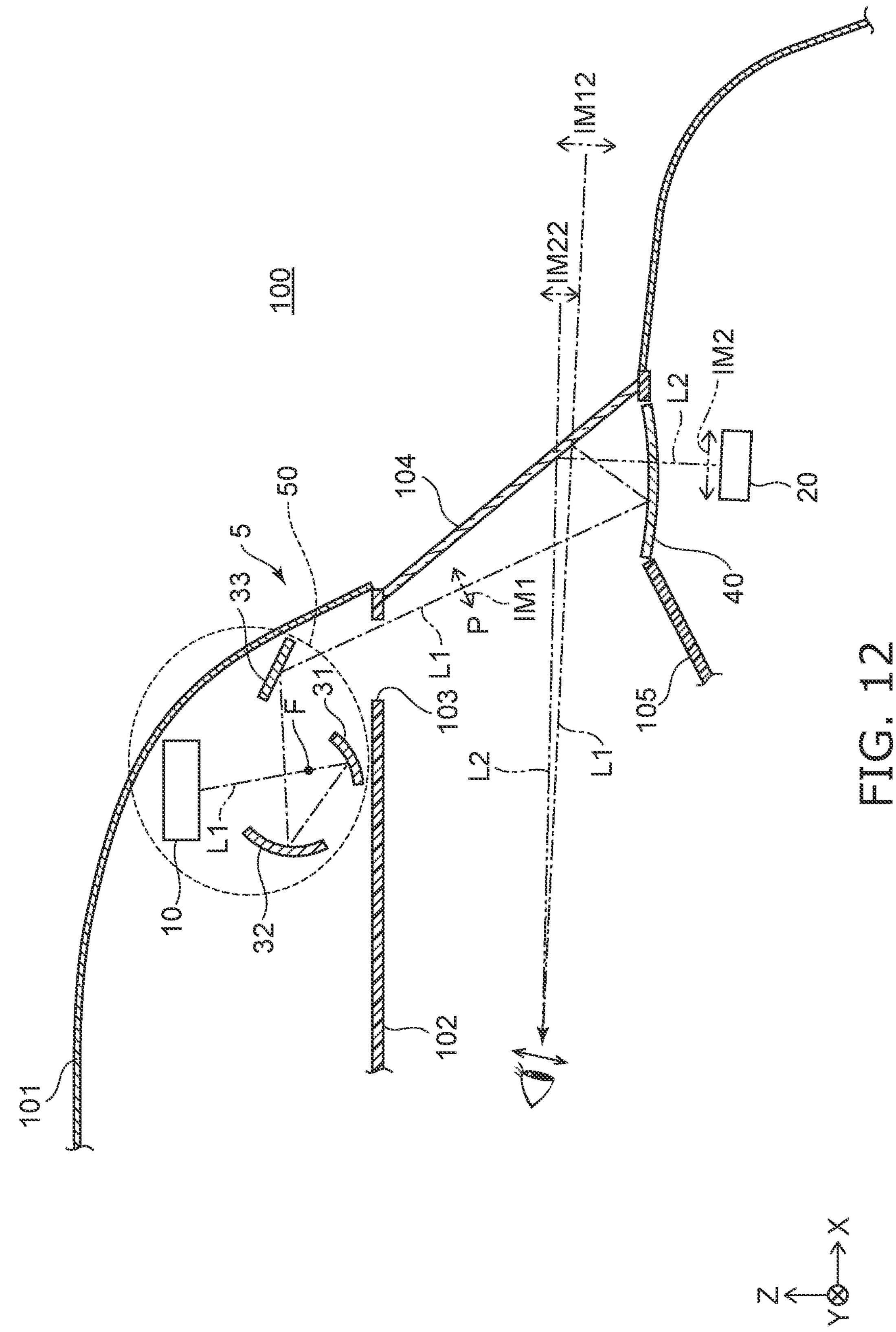
FIG. 12 is an end view showing an image display device according to a fifth embodiment.

FIG. 12 is an end view showing an image display device according to the present embodiment.

In the image display device 5 according to the present embodiment as shown in FIG. 12, the light L1 that is emitted from the imaging optical system 30 and incident on the optical member 40 is reflected by the optical member 40 in a direction between the +X direction (front) and the +Z direction (up) and reaches the front windshield 104 of the vehicle 101. The light L1 is reflected by the inner surface of the front windshield 104 and reaches the eyebox 201 of the viewer 200.

On the other hand, the light L2 that is emitted from the second display device 20 is transmitted by the optical member 40 and reaches the front windshield 104. The light L1 is reflected by the inner surface of the front windshield 104 and reaches the eyebox 201 of the viewer 200. The front windshield 104 may be used as a light-transmitting plate.

As a result, the viewer 200 can view the virtual image IM12 corresponding to the first image IM1 and the virtual image IM22 corresponding to the second image IM2 through the front windshield 104. For example, the virtual image IM12 appears more distant than the virtual image IM22.

According to the present embodiment, the viewer 200 can view the virtual images IM12 and IM22 through the front windshield 104. As a result, the viewer 200 can perceive the content displayed in the virtual images IM12 and IM22 without removing the line of sight from the front of the automobile 100. Thus, for example, the image display device 5 according to the present embodiment forms a HUD of the automobile 100. Otherwise, the configuration, operations, and effects according to the present embodiment are similar to those of the first embodiment.

Sixth Embodiment

Figure 13:
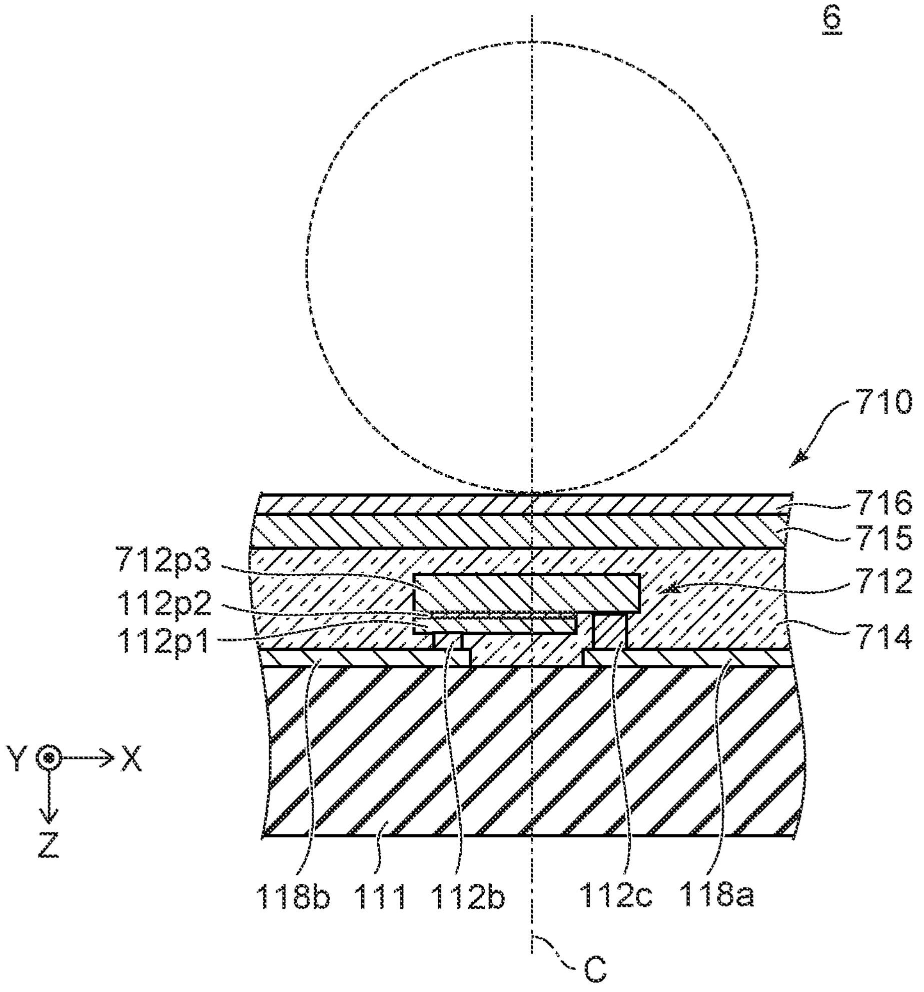
FIG. 13 is an end view showing a portion of a first display device of an image display device according to a sixth embodiment.

FIG. 13 is an end view showing a portion of a first display device of an image display device according to the present embodiment.

As shown in FIG. 13, the image display device 6 according to the present embodiment differs from the first embodiment in that a first display device 710 is included instead of the first display device 10. The first display device 710 differs from the first display device 10 according to the first embodiment in that the surface of an n-type semiconductor layer 712*p*3 positioned at the side opposite to the surface facing the active layer 112*p*2 is substantially flat, and a protective layer 714, a wavelength conversion member 715, and a color filter 716 are further included.

The protective layer 714 covers multiple LED elements 712 arranged in a matrix configuration. The protective layer 714 can include, for example, a light-transmitting material such as a polymer material that includes a sulfur (S)-including substituent group or a phosphorus (P) atom-including group, a high refractive index nanocomposite material in which inorganic nanoparticles having a high refractive index are added to a polymer matrix of polyimide, etc.

The wavelength conversion member 715 is located on the protective layer 714. The wavelength conversion member 715 includes one or more types of wavelength conversion material such as a general fluorescer material, a perovskite fluorescer material, a quantum dot (QD), etc. The light that is emitted from each LED element 712 is incident on the wavelength conversion member 715. The wavelength conversion material that is included in the wavelength conversion member 715 emits light of a different light emission peak wavelength from the light emission peak wavelength of the LED element 712 by the light emitted from the LED element 712 being incident on the wavelength conversion material. The light that is emitted by the wavelength conversion member 715 has a substantially Lambertian light distribution.

The color filter 716 is located on the wavelength conversion member 715. The color filter 716 is configured to shield the greater part of the light emitted from the LED element 712. Accordingly, the light that is emitted mainly by the wavelength conversion member 715 is emitted from each pixel 11*p*. Therefore, as shown by the broken line in FIG. 13, the light that is emitted from each pixel 11*p* has a substantially Lambertian light distribution. When the greater part of the light emitted from the LED element is absorbed by the wavelength conversion member, a color filter may not be included in the display device. Thus, the light that is emitted from each pixel can have a Lambertian light distribution even when multiple recesses or protrusions are not provided in the light-emitting surface of the LED element.

According to the present embodiment, the light emission peak wavelength of the LED element 712 may be in the ultraviolet region or may be in the visible light region. When blue light is to be emitted from at least one pixel 11*p*, for example, blue light may be emitted from the LED element 712 of such a pixel 11*p*, and the wavelength conversion member 715 and the color filter 716 may not be provided for this pixel 11*p*. In such a case, the light that is emitted from the pixel 11*p* may have a substantially Lambertian light distribution by providing a light-scattering member including light-scattering particles to cover the LED element 712. Otherwise, the configuration, operations, and effects according to the present embodiment are similar to those of the first embodiment.

Seventh Embodiment

Figure 14:
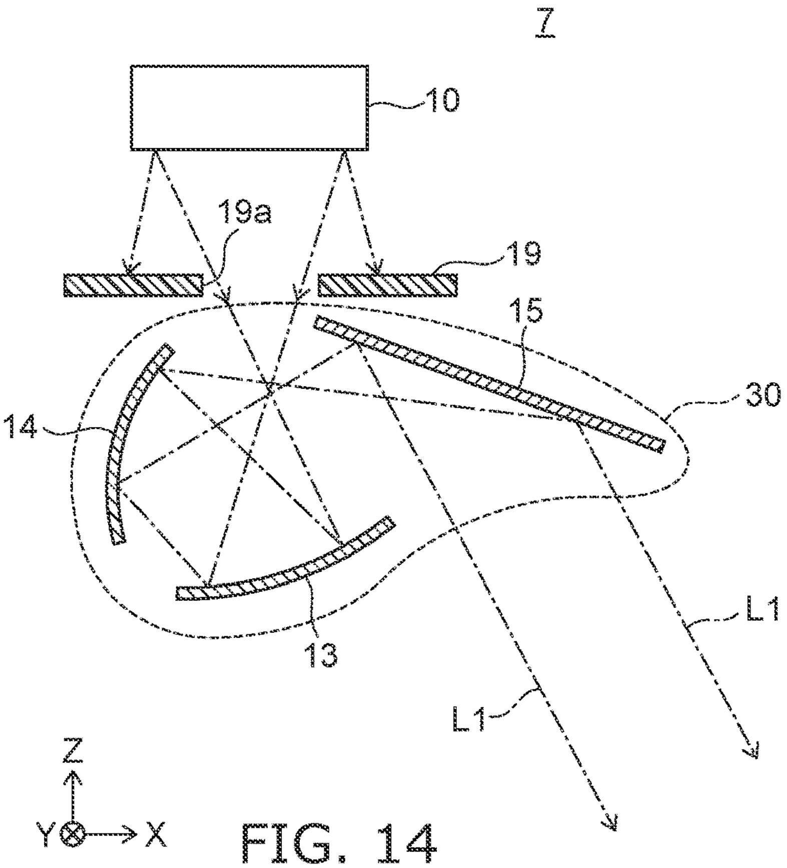
FIG. 14 is an end view showing a light source unit of an image display device according to a seventh embodiment.

FIG. 14 is an end view showing a light source unit of an image display device according to the present embodiment.

As shown in FIG. 14, the image display device 7 according to the present embodiment includes a light-shielding member 19 in addition to the configuration of the image display device 1 according to the first embodiment.

The light-shielding member 19 is located in the optical path from the first display device 10 toward the imaging optical system 30. An aperture 19*a* is provided in the light-shielding member 19, and a portion of the light from the first display device 10 toward the imaging optical system 30 passes through the aperture 19*a*. The light-shielding member 19 shields another portion of the light from the first display device 10 toward the imaging optical system 30.

According to the present embodiment, by including the light-shielding member 19, the occurrence of stray light can be suppressed, and the quality of the virtual image can be improved even further. Otherwise, the configuration, operations, and effects according to the present embodiment are similar to those of the first embodiment.

Eighth Embodiment

Figure 15:
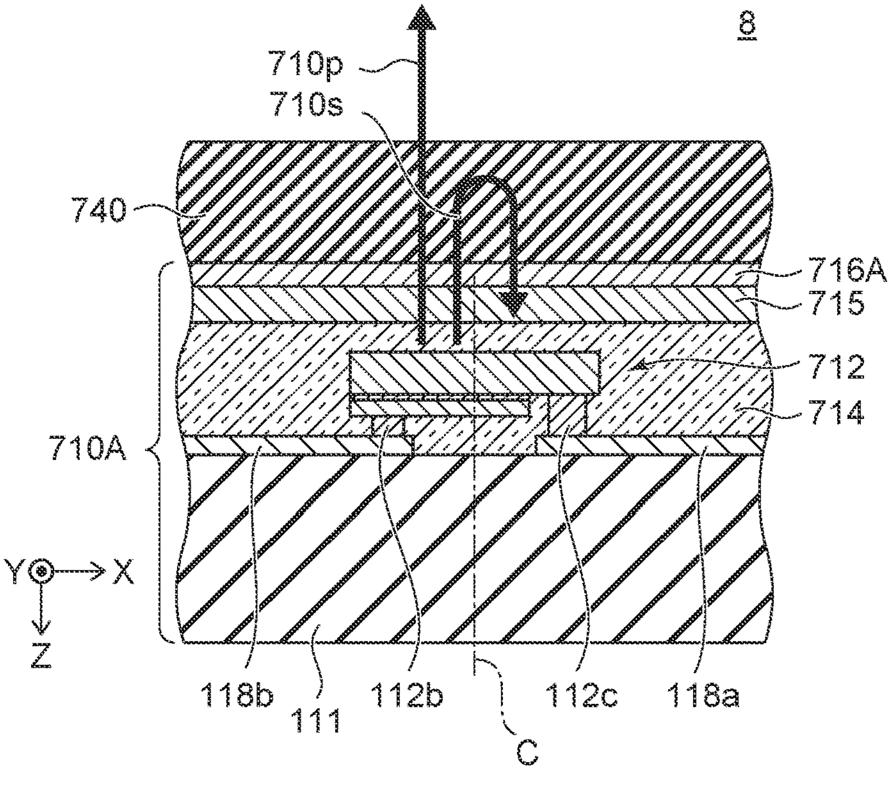
FIG. 15 is an end view showing a portion of an image display device according to an eighth embodiment.

FIG. 15 is an end view showing a portion of an image display device according to the present embodiment.

As shown in FIG. 15, the image display device 8 according to the present embodiment differs from the image display device 1 according to the first embodiment in that a first display device 710A is included instead of the first display device 10, and a reflective polarizing element 740 is further included.

The first display device 710A differs from the first display device 710 according to the sixth embodiment (see FIG. 13) in that the color filter 716 is not included, and a light-scattering member 716A is provided to cover the LED element 712. Otherwise, the configuration of the first display device 710A is similar to that of the first display device 710 according to the sixth embodiment. The light-scattering member 716A includes, for example, a light-transmitting resin member and light-scattering particles or voids located inside the resin member. Examples of the resin member include, for example, polycarbonate, etc. Examples of the light-scattering particles include, for example, materials having a refractive index difference with the resin member such as titanium oxide, etc. An unevenness a light scattering effect may be obtained by providing an unevenness in the surface of the light-scattering member 716A by surface roughening.

The reflective polarizing element 740 is located on the first display device 710A. According to the present embodiment, the reflective polarizing element 740 is located on the light-scattering member 716A. Therefore, the light that is emitted from the LED element 712 and the wavelength conversion member 715 is incident on the reflective polarizing element 740. The reflective polarizing element 740 transmits a first polarized light 710*p* of the light emitted from the first display device 710A and reflects, toward the first display device 710A, a second polarized light 710*s* of the light emitted from the display device 710A. The oscillation direction of the electric field of the second polarized light 710*s* is substantially orthogonal to the oscillation direction of the electric field of the first polarized light 710*p*.

According to the present embodiment, the first polarized light 710*p* is P-polarized light, and the second polarized light 710*s* is S-polarized light. Herein, "P-polarized light" means the light L1 emitted from the first display device 710A of which the oscillation direction of the electric field is substantially parallel to the incident plane when incident on the front windshield 104. "S-polarized light" means the light L1 emitted from the first display device 710A of which the oscillation direction of the electric field is substantially perpendicular to the incident plane when incident on the front windshield 104.

There are cases where the viewer 200 riding in the vehicle 101 wears polarized sunglasses to reduce glare such as sunlight reflected by a puddle in front of the vehicle 101 and transmitted by the front windshield 104, etc. In such a case, the component corresponding to P-polarized light of the sunlight reflected by the puddle or the like when viewed from the front windshield 104 is particularly reduced; therefore, the polarized sunglasses are designed to shield the greater part of S-polarized light. Accordingly, when the viewer 200 wears polarized sunglasses, there is a possibility that the virtual image IM12 may be difficult for the viewer 200 to view because the polarized sunglasses undesirably shield the greater part of the S-polarized light included in the light emitted by the first display device 710A. In the specification, P-polarized light and S-polarized light are physically defined by reflection objects such as the puddles and the like described above.

According to the present embodiment, the reflective polarizing element 740 transmits the first polarized light 710*p* and reflects the second polarized light 710*s* of the light emitted from the first display device 710A. After traveling via the imaging optical system 30 and the optical member 40, the greater part of the first polarized light 710*p* transmitted by the reflective polarizing element 740 enters the eyebox 201 without being shielded by the polarized sunglasses. The incident angle of the first polarized light 710*p* when incident on the inner surface of the front windshield 104 is set to a different angle from Brewster's angle.

Specifically, the light that is emitted from the LED element 712 is irradiated on the wavelength conversion member 715. As a result, the wavelength conversion member 715 is excited and emits light of a longer light emission peak wavelength than the light emitted from the LED element 712. According to the present embodiment, the light that is emitted from the first display device 710A includes light emitted from the LED element 712 and light emitted from the wavelength conversion member 715. Hereinbelow, the light that is emitted from the LED element 712 and emitted from the display device 710A also is called "short-wavelength light," and the light that is emitted from the wavelength conversion member 715 and emitted from the display device 710A also is called "long-wavelength light". However, a greater part of the light emitted from the LED element 712 may be absorbed by the wavelength conversion member 715. The greater part of the first polarized light 710*p* included in the short-wavelength and long-wavelength light is transmitted by the reflective polarizing element 740 and emitted from the imaging optical system 30.

The greater part of the second polarized light 710*s* included in the short-wavelength and long-wavelength light is reflected by the reflective polarizing element 740. Scattering reflection of a portion of the second polarized light 710*s* reflected by the reflective polarizing element 740 is performed by components of the first display device 710A such as the light-scattering member 716A, the wavelength conversion member 715, etc. A portion of the second polarized light 710*s* is converted into the first polarized light 710*p* by the scattering reflection. A portion of the first polarized light 710*p* converted from the second polarized light 710*s* is transmitted by the reflective polarizing element 740 and emitted from the light source unit. Therefore, the luminance of the real image IM11 can be increased while increasing the ratio of the first polarized light 710*p* included in the light emitted from the light source unit. By improving the luminance of the real image IM11, the luminance of the virtual image IM12 also is improved. As a result, the viewer 200 easily views the virtual image IM12.

A portion of the short-wavelength light included in the second polarized light 710*s* may be reflected by the reflective polarizing element 740 and then incident on the wavelength conversion member 715. In such a case, an effect can be expected in which the wavelength conversion member 715 absorbs the short-wavelength light of the second polarized light 710*s* and radiates new long-wavelength light. Both the scattered reflection light and the radiated light have substantially Lambertian light distributions. The reflective polarizing element 740 itself may perform scattering reflection of the second polarized light 710*s*. In such a case as well, a portion of the second polarized light 710*s* is converted into the first polarized light 710*p* by the scattering reflection.

For example, a multilayer stacked thin film polarizing plate in which thin film layers of different polarization characteristics are stacked, etc., can be used as the reflective polarizing element 740.

According to the present embodiment, one reflective polarizing element 740 covers all of the pixels of the first display device 710A. However, the image display device 8 may include multiple reflective polarizing elements, and the reflective polarizing elements may be located respectively on the pixels. The configuration of the first display device used in combination with the reflective polarizing element is not limited to the configuration described above. For example, the first display device may be configured without a light-scattering member by using the light scattering reflection effect of the wavelength conversion member. The first display device may be configured without a wavelength conversion member by using the scattering reflection effect of the light-scattering member. The first display device may be configured without a wavelength conversion member or a light-scattering member by using the light scattering reflection effect of multiple recesses or multiple protrusions provided in the light-emitting surface of the LED element as in the first embodiment.

Effects of the present embodiment will now be described.

According to the image display device 8 according to the present embodiment, the luminance of the real image IM11 can be increased while increasing the ratio of the first polarized light 710*p* included in the light emitted from the light source unit.

The light that is emitted from the reflective polarizing element 740 also has a substantially Lambertian light distribution. Therefore, according to the present embodiment as well, the light source unit 50 that is small and can form a high-quality real image IM11 can be provided. Because the multiple LED elements 712 are discretely mounted on the substrate 111, the real image IM11 may have a grainy appearance. The wavelength conversion member 715 has the effect of relaxing the grainy appearance. The light-scattering member 716A can further reinforce the effect of relaxing the grainy appearance.

Although an example is described in the present embodiment in which the first display device includes a reflective polarizing element, the second display device also may include a reflective polarizing element. Otherwise, the configuration, operations, and effects according to the present embodiment are similar to those of the first embodiment.

Embodiments and their modifications described above are examples embodying the invention, and the invention is not limited to these embodiments and their modifications. For example, additions, deletions, or modifications of some of the components also are included in the invention according to the present embodiments and modifications described above. The present embodiments and modifications described above can be implemented in combination with each other.

For example, the invention can be utilized in a head-up display, etc.

What is claimed is:

1. An image display device comprising:

a first display device configured to display a first image;

an imaging optical system comprising:

an input element configured to receive light emitted from the first display device, and an output element configured to receive light traveling via the input element and to emit light to form a real image corresponding to the first image;

a second display device configured to display a second image; and an optical member configured to reflect light emitted from the imaging optical system and to transmit light emitted from the second display device, such that light emitted from the imaging optical system and reflected by the optical member travels in a same direction as light emitted from the second display device and transmitted by the optical member; wherein:

the imaging optical system is substantially telecentric at a real image side, the first display device is configured such that the light emitted from the first display device exhibits a substantially Lambertian light distribution; and the imaging optical system and the optical member are configured such that the real image is formed between the imaging optical system and the optical member.

2. The image display device according to claim 1, wherein:

the optical member includes:

a first region reflecting the light emitted from the imaging optical system, and a second region transmitting the light emitted from the second display device; and at least a portion of the first region and at least a portion of the second region overlap.

3. The image display device according to claim 1, wherein:

the optical member includes:

a first region reflecting the light emitted from the imaging optical system, and a second region transmitting the light emitted from the second display device; and the first region and the second region are separated from each other.

4. The image display device according to claim 1, wherein:

the optical member has a curved plate shape with a concave surface that faces the first display device side.

5. The image display device according to claim 1, wherein:

the optical member includes:

a first surface configured to reflect the light emitted from the imaging optical system, a second surface configured to receive the light emitted from the second display device, and a third surface configured to receive light from the second surface and to reflect the received light toward the first surface.

6. The image display device according to claim 1, further comprising:

a reflecting member configured to reflect, toward the optical member, the light emitted from the second display device.

7. The image display device according to claim 1, further comprising:

a light-transmitting plate configured to reflect the light emitted from the imaging optical system and reflected by the optical member and the light emitted from the second display device and transmitted by the optical member.

8. The image display device according to claim 1, wherein:

the first display device is configured such that the light emitted from the first display device exhibits a light distribution pattern in which a luminous intensity in a direction of an angle θ with respect to an optical axis of the light emitted from the first display device is approximated by $\cos^n\theta$ times a luminous intensity at the optical axis, and n is a value greater than 0.

9. The image display device according to claim 8, wherein:

n is not more than 11.

10. The image display device according to claim 1, wherein:

the first display device is an LED display comprising a plurality of LED elements.

11. The image display device according to claim 10, wherein:

the LED elements are configured to emit light that exhibits a substantially Lambertian light distribution.

12. The image display device according to claim 10, wherein:

the first display device further comprises a wavelength conversion member located on the LED elements; and the wavelength conversion member is configured to receive the light emitted from the LED elements.

13. The image display device according to claim 1, wherein:

the imaging optical system comprises:

a bending part comprising the input element, and a direction modifying part comprising the output element; wherein:

the bending part is configured to bend a plurality of chief rays that have been emitted from mutually-different positions of the first display device and have intersected each other before being incident on the input element, and to form the real image;

the bending part is configured to bend the plurality of chief rays to be substantially parallel to each other before and after forming the real image; and the direction modifying part is configured to modify a travel direction of the plurality of chief rays traveling via the bending part to be oriented toward a formation position of the real image.

14. The image display device according to claim 1, further comprising:

a light-shielding member located between the first display device and the imaging optical system; wherein:

the light-shielding member has an aperture through which a first portion of light from the first display device toward the imaging optical system passes;

the light-shielding member is configured to shield a second portion of the light from the first display device traveling toward the imaging optical system.

15. The image display device according to claim 1, further comprising:

a reflective polarizing element located in a part of an optical path between the first display device and the optical member; wherein:

the first display device is configured to emit, from mutually-different positions of the first display device, a plurality of chief rays that are substantially parallel to each other in the part of the optical path and that pass through the real image;

the reflective polarizing element is configured to transmit a first polarized light of the light emitted from the first display device, and to reflect a second polarized light of the light emitted from the first display device to return to the first display device.

16. An automobile comprising:

a vehicle; and the image display device according to claim 1, mounted in the vehicle.

* * * * *